United States Patent
Ohwaki et al.

(10) Patent No.: US 7,899,122 B2
(45) Date of Patent: Mar. 1, 2011

(54) METHOD, APPARATUS AND COMPUTER PROGRAM PRODUCT FOR GENERATING INTERPOLATION FRAME

(75) Inventors: Kazuyasu Ohwaki, Kanagawa (JP); Goh Itoh, Tokyo (JP); Nao Mishima, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1364 days.

(21) Appl. No.: 11/368,440

(22) Filed: Mar. 7, 2006

(65) Prior Publication Data
US 2006/0222077 A1 Oct. 5, 2006

(30) Foreign Application Priority Data

Mar. 31, 2005 (JP) ............................ 2005-100856
Sep. 16, 2005 (JP) ............................ 2005-271077

(51) Int. Cl.
*H04N 7/12* (2006.01)
(52) U.S. Cl. ............ 375/240.16; 375/240.1; 375/240.12; 375/240.14; 375/240.24; 348/E5.067
(58) Field of Classification Search .............. 375/240, 375/240.12–240.16, 240.01, 240.03, 240.1, 375/240.24
See application file for complete search history.

(56) References Cited

U.S. PATENT DOCUMENTS

| | | | |
|---|---|---|---|
| 7,103,231 B2 * | 9/2006 | Cornog et al. | 382/276 |
| 7,561,621 B2 * | 7/2009 | Itoh et al. | 375/240.16 |
| 7,676,063 B2 * | 3/2010 | Cohen et al. | 382/103 |
| 7,720,153 B2 * | 5/2010 | Sugimoto et al. | 375/240.16 |
| 7,729,563 B2 * | 6/2010 | Kameyama et al. | 382/299 |
| 7,738,556 B2 * | 6/2010 | Nakamura et al. | 375/240.16 |
| 7,817,718 B2 * | 10/2010 | Wang et al. | 375/240.16 |
| 2003/0174777 A1 | 9/2003 | Itoh et al. | |
| 2004/0046891 A1 | 3/2004 | Mishima et al. | |
| 2004/0101058 A1 * | 5/2004 | Sasai et al. | 375/240.26 |

(Continued)

FOREIGN PATENT DOCUMENTS

JP 2000-224593 8/2000

(Continued)

OTHER PUBLICATIONS

Notice of Rejection issued by the Japanese Patent Office on Nov. 18, 2008, for Japanese Patent Application No. 2005-271077, and Partial English Translation thereof.

*Primary Examiner* — Shuwang Liu
*Assistant Examiner* — Hirdepal Singh
(74) *Attorney, Agent, or Firm* — Finnegan, Henderson, Farabow, Garrett & Dunner, L.L.P.

(57) ABSTRACT

A method for generating an interpolation frame between first and second reference frames includes dividing an interpolation frame into several interpolation areas; detecting a most correlated combination from several combinations between first reference areas and second reference areas for each interpolation area; obtaining a motion vector from the first and second reference areas; determining whether the first reference areas and the second reference areas are in a high-correlated area or a low-correlated area; giving the motion vector to the motion vector detected area, the motion vector detected area corresponding to the interpolation area which is determined to be the high-correlated area in the first and second reference areas; determining a motion vector to be given to the motion vector undetected area; and generating the interpolation frame based on the motion vector given to the motion vector detected area and the motion vector determined for the motion vector undetected area.

44 Claims, 29 Drawing Sheets

U.S. PATENT DOCUMENTS

| | | |
|---|---|---|
| 2004/0240551 A1 | 12/2004 | Itoh et al. |
| 2004/0246374 A1 | 12/2004 | Mishima et al. |
| 2005/0053291 A1 | 3/2005 | Mishima et al. |
| 2005/0100095 A1 | 5/2005 | Itoh et al. |
| 2005/0157792 A1 | 7/2005 | Baba et al. |
| 2006/0083310 A1* | 4/2006 | Zhang .................. 375/240.16 |
| 2009/0316789 A1* | 12/2009 | Sasai et al. ............. 375/240.16 |

FOREIGN PATENT DOCUMENTS

| | | |
|---|---|---|
| JP | 2004-104656 | 4/2004 |
| JP | 2004-128702 | 4/2004 |
| JP | 2004-320278 | 11/2004 |
| JP | 2004-320279 | 11/2004 |
| JP | 2004-357215 | 12/2004 |
| JP | 2005-51460 | 2/2005 |

\* cited by examiner

210 FIRST FRAME

220 SECOND FRAME

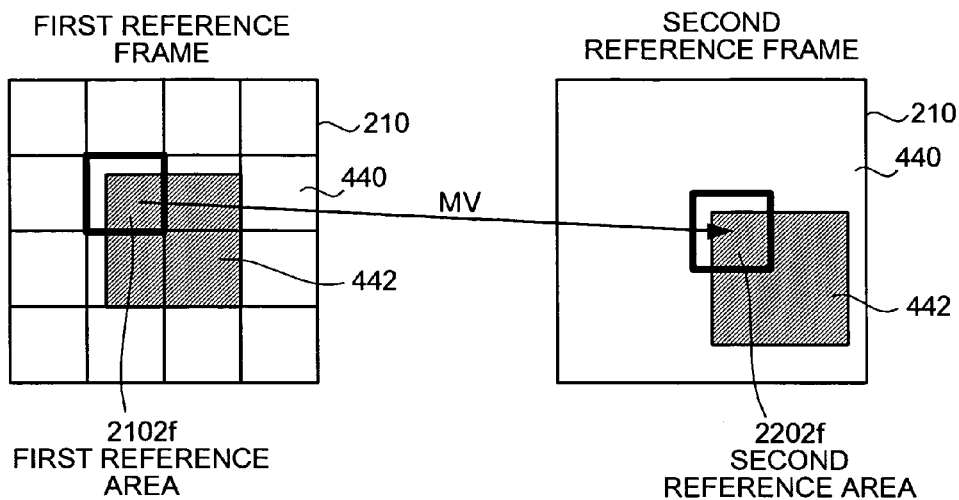

FIG.27
| 24 | 24 | 24 | 24 | 24 |
|---|---|---|---|---|
| 24 | 0 | 0 | 0 | 0 |
| 24 | 0 | 0 | 0 | 0 |
| 24 | 0 | 0 | 0 | 0 |
| 24 | 0 | 0 | 0 | 0 |
212f
| 24 | 24 | 24 | 24 | 24 |
|---|---|---|---|---|
| 24 | 0 | 0 | 0 | 0 |
| 24 | 0 | 0 | 0 | 0 |
| 24 | 0 | 0 | 0 | 0 |
| 24 | 0 | 0 | 0 | 0 |
222f
FIG.28
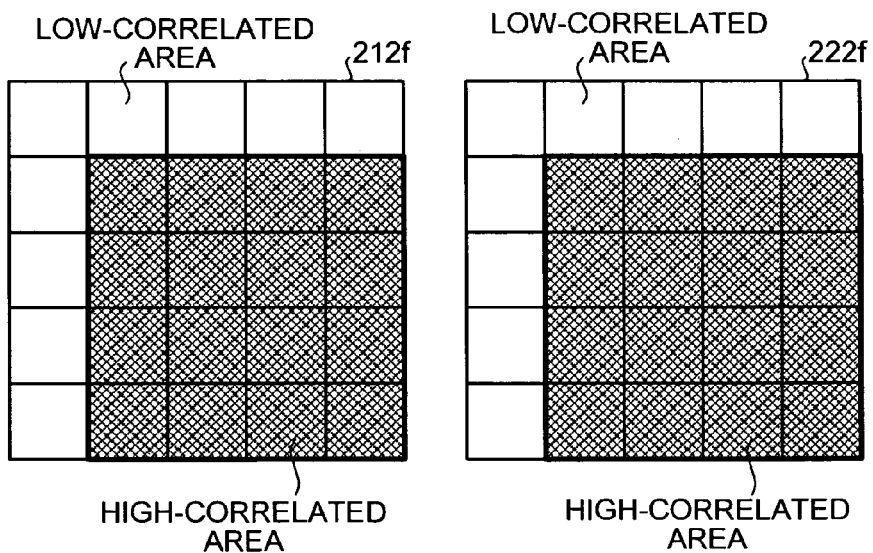
FIG.29
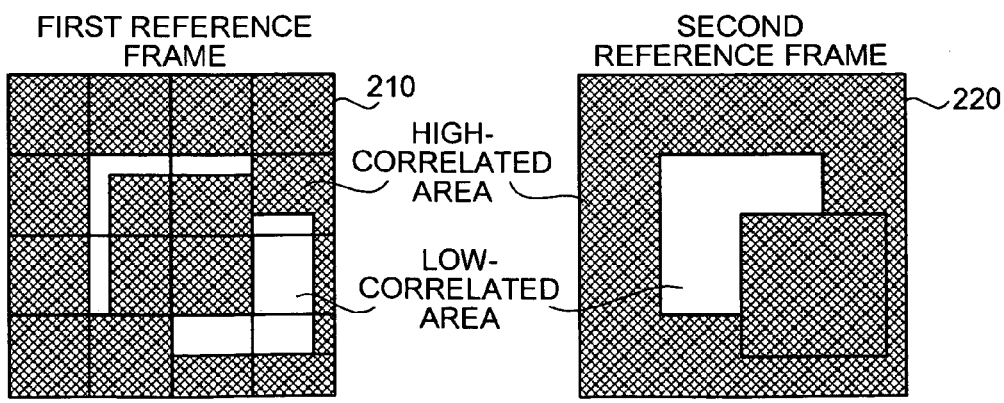

METHOD, APPARATUS AND COMPUTER PROGRAM PRODUCT FOR GENERATING INTERPOLATION FRAME

CROSS-REFERENCE TO RELATED APPLICATIONS

This application is based upon and claims the benefit of priority from the prior Japanese Patent Applications: No. 2005-100856, filed on Mar. 31, 2005; and No. 2005-271077, filed on Sep. 16, 2005; the entire contents of which are incorporated herein by reference.

BACKGROUND OF THE INVENTION

1. Field of the Invention

The present invention relates to an interpolation frame generating method, an interpolation frame generating apparatus, and a computer program product for generating an interpolation frame which interpolates between two frames.

2. Description of the Related Art

Generally, an image display includes two types such as an impulse type display for continuously emitting only during the persistence time of a phosphor after, an image is written (for example, CRT or field emission type display (FED)), and a hold type display for continuously holding a display of a previous frame until an image is newly written (for example, liquid crystal display (LCD), electro-luminescence display (ELD)).

One of the problems on the hold type display is a blurring phenomenon occurring in moving picture display. The occurrence of blurring phenomenon is causes by the fact that when a moving object is present in an image over several frames and eyes of an observer follow the motion of the moving object, images of the several frames are projected on the retina in an overlapped manner.

Before a displayed image is switched from the previous frame to the next frame, though the image on the same previous frame is being continuously displayed, human eyes predict a display of an image on the next frame and observe it while moving in the moving direction of the moving object on the previous frame image. In other words, since the eye following motion is continuous and sampling finer than the frame interval is performed, human eyes view an image between two adjacent frames, which is observed as blur.

In order to solve this problem, the frame interval of display has only to be shorter. Thus, it is possible to improve unnatural motion in a moving picture having a small number of display frames. As a specific-method, there is considered to utilize motion compensation used in MPEG2 (Moving Picture Experts Group Phase 2) to create interpolation images and to interpolate between adjacent frames.

The motion compensation uses a motion vector detected by block matching. However, since an image is created on block basis in MPEG2, when several objects whose motions are different are contained in a block, correlated portions and non-correlated portions occur, which cause block distortion in the non-correlated portions.

A frame interpolating method for solving such a problem is disclosed (for example, see Japanese Patent Application. Laid-Open No. 2000-224593). One block is divided into several areas and a motion vector is found for each area. Thus, it is possible to reduce block distortion when objects whose motions are different are contained in the block. Further, a motion vector detecting method suitable for dividing a block into areas by a threshold is used and a motion vector detecting method suitable for a pixel block after being divided into areas is used, thereby detecting an optimum motion vector for each area.

The frame interpolating method disclosed in Japanese Patent Application Laid-Open No. 2000-224593 allows the reduction of the deterioration of image quality but cannot calculate a motion vector for an occlusion area accurately.

SUMMARY OF THE INVENTION

According to one aspect of the present invention, a method for generating an interpolation frame between a first reference frame and a second reference frame, includes dividing the interpolation frame into several interpolation areas containing several pixels; detecting a most correlated combination from several combinations between first reference areas and second reference areas for each of the interpolation areas, the first reference areas being in the first reference frame and having the same size and shape as the interpolation areas, the second reference areas being in the second reference frame and having the same size and shape as the interpolation areas, the each of the interpolation areas, the first reference area of each of the several combinations, and the second reference area of the each of the several combinations being arranged straight time-wise; obtaining a motion vector from the first reference area and the second reference area included in a detected combination; determining whether the first reference areas and the second reference areas are in a high-correlated area or a low-correlated area; giving the motion vector to the motion vector detected area, the motion vector detected area corresponding to the interpolation area which is determined to be the high-correlated area in the first reference area and the second reference area; determining a motion vector to be given to the motion vector undetected area by motion estimation using the motion vector undetected area, a first area, a third reference frame, a second area, and a fourth reference frame, the first area being in the first reference frame and being determined as the low correlated area, the third reference frame being in a direction temporally identical to the first reference frame with the interpolation frame as a reference, the second area being in the second reference frame and being determined as the low-correlated area; and the fourth reference frame being in a direction temporally identical to the second reference frame with the interpolation frame as a reference, the motion vector undetected area corresponding to the interpolation area which is determined to be the low-correlated area in the first reference area and the second reference area; and generating the interpolation frame based on the motion vector given to the motion vector detected area and the motion vector determined for the motion vector undetected area.

According to another aspect of the present invention, a method for generating an interpolation frame between a first reference frame and a second reference frame, includes dividing the first reference frame into several first reference areas each constituted of several pixels; detecting second reference areas which have the same size and shape as the first reference areas and most correlated therewith in the second reference frame, obtaining motion vectors of the detected second reference areas and the first reference areas; determining whether the first reference areas and the second reference areas are in a high-correlated area or a low-correlated area; giving the motion vector to the motion vector detected area, the motion vector detected area being determined to be the high-correlated area; determining a motion vector of the motion vector undetected area by motion estimation using the motion vector undetected area and a third reference frame, the third reference frame being in a direction temporally opposite to the second reference frame with the first reference frame as a reference, and the motion vector undetected area being determined to be the low-correlated area and being in the first reference area; and generating the interpolation frame based on the motion vector given to the motion vector detected area and the motion vector determined for the motion vector undetected area.

According to still another aspect of the present invention, a method for generating an interpolation frame between a first reference frame and a second reference frame includes dividing the interpolation frame into several interpolation areas each constituted of several pixels; detecting a most correlated combination from combinations between first reference areas and second reference areas for each of the interpolation areas, the first reference areas being in the first reference frame and having the same size and shape as the interpolation areas, the second reference areas being in the second reference frame and having the same size and shape as the interpolation areas, the each of the interpolation frames, the first reference area of each of the several combinations and the second reference area of the each of the several combinations being arranged straight time-wise; obtaining a motion vector from the first reference area and the second reference area included in a detected combination; determining whether the first reference area and the second reference area are in a high-correlated area or a low-correlated area; giving the motion vector detected area corresponding to the interpolation area which is determined to be the high-correlated area in the first reference area and the second reference area; giving the motion vector undetected area corresponding to the interpolation area which is determined to be the low-correlated area in the first reference area and the second reference area; and generating the interpolation frame based on the motion vector given to the motion vector detected area and the motion vector given to the motion vector undetected area.

According to still another aspect of the present invention, a method for generating an interpolation frame between a first reference frame and a second reference frame includes dividing the first reference frame into several first reference areas each constituted of several pixels; detecting second reference areas having the same size and shape as the first reference areas and being the most correlated to the first reference areas in the second reference frame, obtaining motion vectors of the detected second reference areas and the first reference areas; determining whether the first reference area and the second reference area are in a high-correlated area or a low-correlated area; giving the motion vector to the motion vector detected area, the motion vector detected area being determined to be the high-correlated area in the first reference area; giving the motion vector given to the motion vector detected area arranged around the motion vector undetected area to the motion vector undetected area to the motion vector undetected area, the motion vector undetected area being determined to be the low-correlated area in the first reference area; and generating the interpolation frame based on the motion vector given to the motion vector detected area and the motion vector given to the motion vector undetected area.

According to still another aspect of the present invention, a computer program product causes a computer to perform any one of the methods according to the present invention.

According to still another aspect of the present invention, an apparatus for generating an interpolation frame between a first reference frame and a second reference frame includes an interpolation dividing unit that divides the interpolation frame into several interpolation areas containing several pixels; a combination detecting unit that detects a most correlated combination from several combinations between first reference areas and second reference areas for each of the interpolation areas, the first reference areas being in the first reference frame and having the same size and shape as the interpolation areas, the second reference areas being in the second reference frame and having the same size and shape as the interpolation areas, the each of the interpolation areas, the first reference area of each of the several combinations and the second reference area of the each of the several combinations being arranged straight time-wise; a motion estimating unit that obtains a motion vector from the first reference area and the second reference area included in a detected combination; a correlation determining unit that determines whether the first reference areas and the second reference areas are in a high-correlated area or a low-correlated area; a giving unit that gives the motion vector to the motion vector detected area, the motion vector detected area corresponding to the interpolation area which is determined to be the high-correlated area in the first reference area and the second reference area; a motion vector determining unit that determines a motion vector to be given to the motion vector undetected area by motion estimation using the motion vector undetected area, a first area, a third reference frame, a second area, and a fourth reference frame, the first area being in the first reference frame and being determined as the low correlated area, the third reference frame being in a direction temporally identical to the first reference frame with the interpolation frame as a reference, the second area being in the second reference frame and is determined as the low-correlated area; and the fourth reference frame being in a direction temporally identical to the second reference frame with the interpolation frame as a reference, the motion vector undetected area corresponding to the interpolation area which is determined to be the low-correlated area in the first reference area and the second reference area; and a motion compensation unit that generates the interpolation frame based on the motion vector given to the motion vector detected area and the motion vector determined for the motion vector undetected area.

According to still another aspect of the present invention, an apparatus for generating an interpolation frame between a first reference frame and a second reference frame includes an area generating unit that divides the first reference frame into several first reference areas each constituted of several pixels; a second reference detecting unit that detects second reference areas which have the same size and shape as the first reference areas and most correlated therewith in the second reference frame, a motion estimating unit that obtains motion vectors of the detected second reference areas and the first reference areas; a correlation determining unit that determines whether the first reference areas and the second reference areas are in a high-correlated area or a low-correlated area; a motion vector giving unit that gives the motion vector to the motion vector detected area, the motion vector detected area being determined to be the high-correlated area; a motion vector determining unit that determines a motion vector of the motion vector undetected area by motion estimation using the motion vector undetected area and a third reference frame, the third reference frame being in a direction temporally opposite to the second reference frame with the first reference frame as a reference, and the motion vector undetected area being determined to be the low-correlated area and being in the first reference area; and a motion vector compensating unit that generates the interpolation frame based on the motion vector given to the motion vector detected area and the motion vector determined for the motion vector undetected area.

According to still another aspect of the present invention, an apparatus for generating an interpolation frame between a first reference frame and a second reference frame includes an area generating unit that divides the interpolation frame into several interpolation areas each constituted of several pixels; a combination detecting unit that detects a most correlated combination from combinations between first reference areas and second reference areas for each of the interpolation areas, the first reference areas being in the first reference frame and having the same size and shape as the interpolation areas, the second reference areas being in the second reference frame and having the same size and shape as the interpolation areas, the each of the interpolation frames, the first reference area of each of the several combinations and the second reference area of the each of the several combinations being arranged straight time-wise; a motion estimating unit that obtains a motion vector from the first reference area and the second reference area included in a detected combination; a correlation determining unit that determines whether the first reference area and the second reference area are in a high-correlated area or a low-correlated area; a first motion vector giving unit that gives the motion vector detected area corresponding to the interpolation area which is determined to be the high-correlated area in the first reference area and the second reference area; a second motion vector giving unit that gives the motion vector undetected area corresponding to the interpolation area which is determined to be the low-correlated area in the first reference area and the second reference area; and a motion compensation unit that generates the interpolation frame based on the motion vector given to the motion vector detected area and the motion vector given to the motion vector undetected area.

According to still another aspect of the present invention, an apparatus for generating an interpolation frame between a first reference frame and a second reference frame includes an area generating unit that divides the first reference frame into several first reference areas each constituted of several pixels; a second reference area detecting unit that detects second reference areas having the same size and shape as the first reference areas and being the most correlated to the first reference areas in the second reference frame, a motion estimating unit that obtains motion vectors of the detected second reference areas and the first reference areas; a correlation determining unit that determines whether the first reference area and the second reference area are in a high-correlated area or a low-correlated area; a first motion vector giving unit that gives the motion vector to the motion vector detected area, the motion vector detected area being determined to be the high-correlated area in the first reference area; a second motion vector giving unit that gives the motion vector given to the motion vector detected area arranged around the motion vector undetected area to the motion vector undetected area to the motion vector undetected area, the motion vector undetected area being determined to be the low-correlated area in the first reference area; and a motion compensating unit that generates the interpolation frame based on the motion vector given to the motion vector detected area and the motion vector given to the motion vector undetected area.

BRIEF DESCRIPTION OF THE DRAWINGS

FIG. 25 is a diagram showing a second reference area extracted in a motion estimating processing (step S505) relative to a first reference area extracted in a processing target reference area extracting processing (step S504);

FIG. 26 is a diagram showing the first reference area and the second reference area extracted in the motion estimating processing (step S505) on pixel basis;

FIG. 27 is a diagram showing correlation calculation results;

FIG. 28 is a diagram showing the reference area and the reference area classified into a high-correlated area and a low-correlated area respectively based on the correlation calculation results shown in FIG. 27 in a correlation determining processing (step S507);

FIG. 29 is a diagram showing the high-correlated area and the low-correlated area of the first reference frame and the second reference frame;

FIG. 44 is performed;

DETAILED DESCRIPTION OF THE PREFERRED EMBODIMENTS

Exemplary embodiments of an interpolation frame generating method, an interpolation frame generating apparatus and an interpolation frame generating program according to the present invention will be described in detail below with reference to the drawings. The present invention is not limited by the embodiments.

Figure 1:
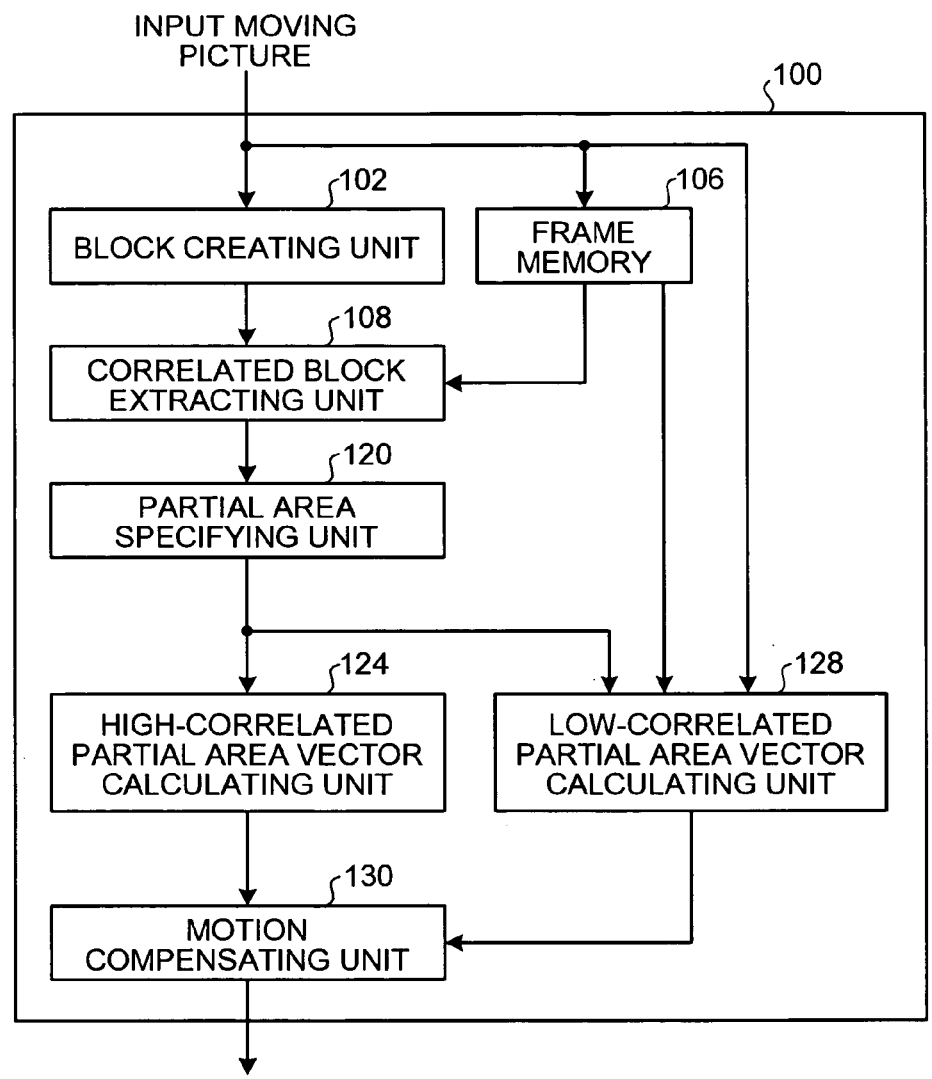
FIG. 1 is a block diagram showing the entire structure of an interpolation image creating apparatus.

FIG. 1 is a block diagram showing the entire structure of an interpolation image creating apparatus 100 (interpolation frame generating apparatus) according to a first embodiment of the present invention. The interpolation image creating apparatus 100 includes a block creating unit 102, a frame memory 106, a correlated block extracting unit 108, a partial area specifying unit 120, a high-correlated partial area motion vector calculating unit 124, a low-correlated partial area motion vector calculating unit 128 and a motion compensating unit 130.

Figure 2:
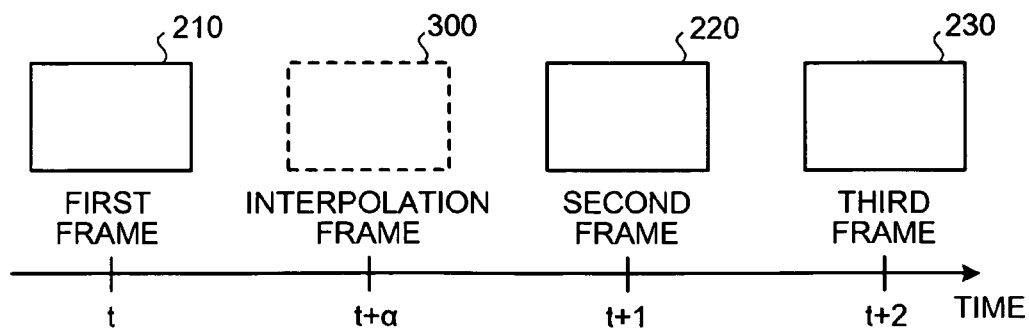
FIG. 2 is a diagram for explaining an interpolation frame.

The interpolation image creating apparatus 100 according to this embodiment creates interpolation frames for interpolating between several frames included in an input image. FIG. 2 shows three consecutive frames included in an input image, that is, a first frame 210, a second frame 220 and a third frame 230. This embodiment will be described by exemplifying a case where an interpolation frame 300 for interpolating between the first frame 210 and the second frame 220 is created.

There is described, in the first embodiment, a case where the interpolation image creating apparatus 100 creates an interpolation frame between two consecutive frames, that is, the first frame 210 and the second frame 220, but the interpolation frame to be created by the interpolation image creating apparatus 100 may only be a frame for interpolating between two different frames, and is not limited to this embodiment.

The block creating unit 102 in the interpolation image creating apparatus 100 shown in FIG. 1 acquires an input moving picture from the outside. Then, the apparatus divides a reference frame in the acquired input moving picture into several blocks arranged in matrix. Here, the reference frame is a frame for setting blocks when performing matching on block basis. For example, the first frame 210 or the second frame 220 is assumed as the reference frame.

Figure 3:
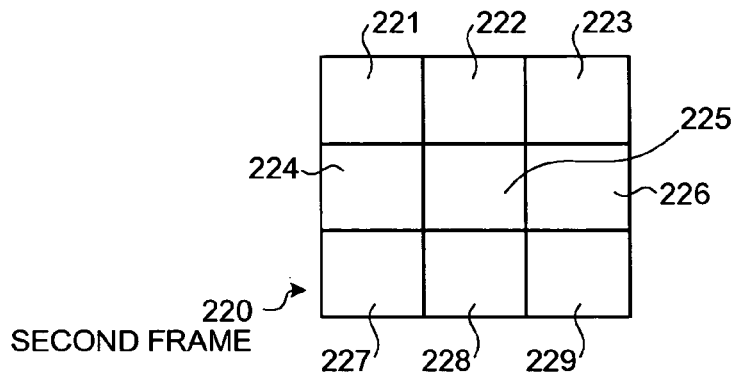
FIG. 3 is a diagram for explaining a processing of a block creating unit.

FIG. 3 is a diagram for explaining a processing of the block creating unit 102. As shown in FIG. 3, the block creating unit 102 divides the second frame 220 to create second blocks. In other words, the second blocks are ones included in the second frame 220. As shown in FIG. 3, the block creating unit 102 divides the second frame 220 into nine second blocks 221 to 229 in matrix. Here, the second frame 220 is the reference frame.

The frame memory 106 acquires the input moving picture from the outside and holds the same. The correlated block extracting unit 108 acquires the second frame 220 divided into several blocks from the block creating unit 102. Further, the unit 108 acquires the first frame 210 from the frame memory 106. Then, the unit 108 extracts the most correlated blocks from the first frame 210 relative to each second block in the second frame 220. Hereinafter, the block which is extracted from the first frame 210 and is the most correlated with a predetermined second block in the second frame 220 is referred to as a first block.

The partial area specifying unit 120 specifies a high-correlated partial area (motion vector detected area) and a low-correlated partial area (motion vector undetected area) in the second blocks. Here, the high-correlated partial area is an area more correlated with a predetermined area in the first frame 210. The low-correlated partial area is an area less correlated with a predetermined area in the first frame 210.

For example, when a correlation value is assumed as a difference value, an area where a difference value between a value of pixels included in a low-correlated block and a value of pixels in the first frame 210 is not less than a predetermined threshold value is assumed as the low-correlated partial area. On the other hand, an area where the difference value is smaller than the threshold value is assumed as the high-correlated partial area. The correlation value preferably uses a value determined by an absolute difference value of luminance information, an absolute difference value of color difference information, a sum of absolute difference values or the number of high-correlated pixels.

The high-correlated partial area motion vector calculating unit 124 calculates a high-correlated partial area motion vector for the high-correlated partial area specified by the partial area specifying unit 120. Here, the high-correlated partial area motion vector is a motion vector between the high-correlated partial area and an area in the first frame 210 corresponding to the high-correlated partial area.

The low-correlated partial area motion vector calculating unit 128 calculates a low-correlated partial area motion vector for the low-correlated partial area specified by the partial area specifying unit 120. Here, the low-correlated partial area motion vector is a motion vector between the low-correlated partial area and an area in the third frame 230 corresponding to the low-correlated partial, area.

The motion compensating unit 130 acquires the high-correlated partial area specified by the partial area specifying unit 120 and an area in the first frame 210 corresponding to the high-correlated partial area. Further, the unit 130 acquires a high-correlated partial area motion vector from the high-correlated partial area motion vector calculating unit 124. Then the unit 130 creates an image of a predetermined area in the interpolation frame based on the high-correlated partial area, the area in the first frame 210 corresponding to the high-correlated partial area and the high-correlated partial area motion vector. At this time, the motion vector is subjected to scale conversion to generate an interpolation frame at a predetermined position.

The motion compensating unit 130 further acquires the low-correlated partial area specified by the partial area specifying unit 120 and an area in the third frame 230 corresponding to the low-correlated partial area. Further, the unit 130 acquires a low-correlated partial area motion vector from the low-correlated partial area motion vector calculating unit 128. Then, the unit 130 creates an image of a predetermined area in the interpolation frame based on the low-correlated partial area, the corresponding area in the third frame 230, and the low-correlated partial area motion vector.

When no image is created in the predetermined area in the interpolation frame 300 by the above processing, an image of the area may be created by the weighted average value or median processing based on an image adjacent to the area, an image included in the first frame 210, the second frame 220 or the like, and the motion vector between these frames.

Specifically, an average value or median value of the motion vector given to the image-uncreated area is utilized to create an image for the area.

Figure 4:
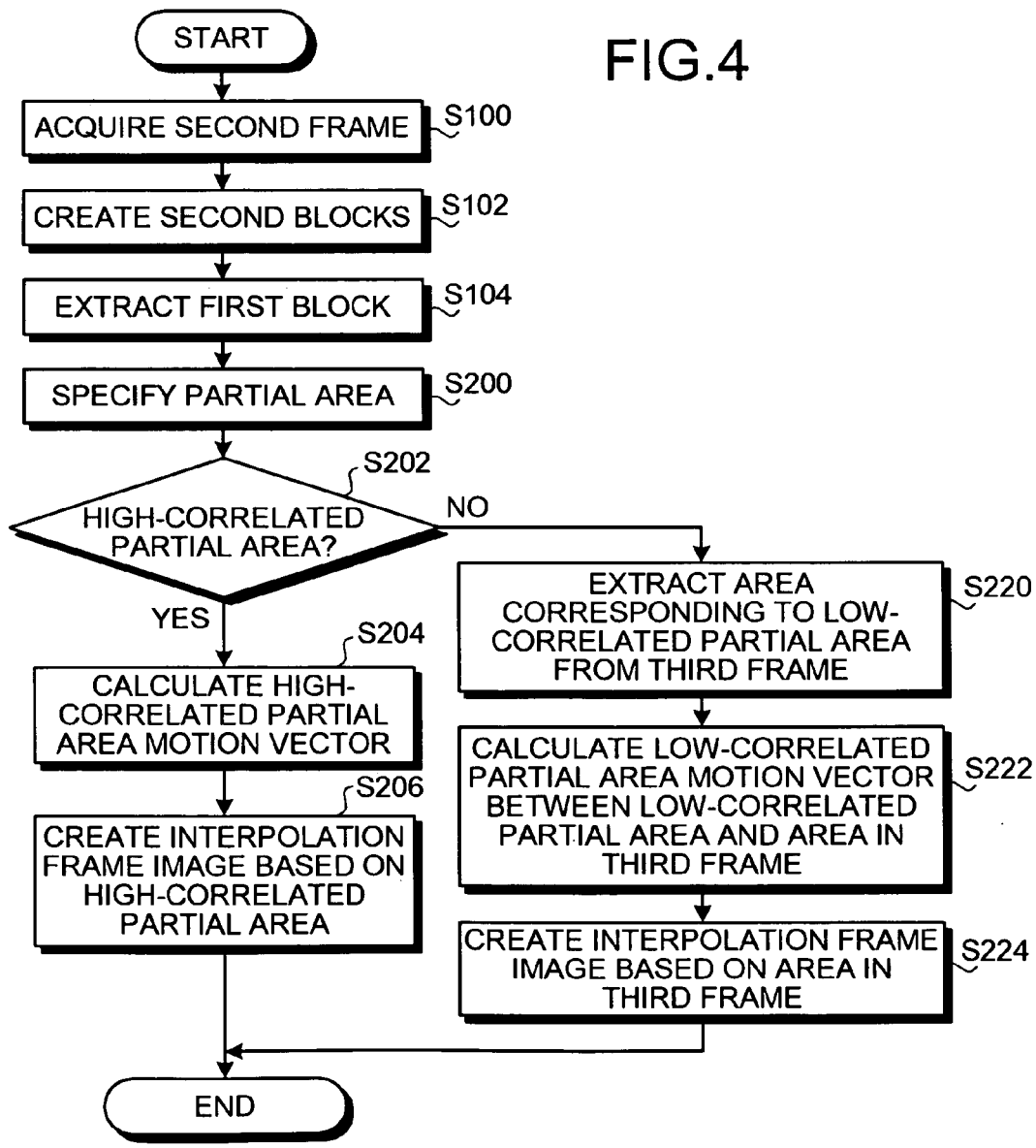
FIG. 4 is a flowchart showing an interpolation image creating processing by the interpolation image creating apparatus.

FIG. 4 is a flowchart showing an interpolation image creating processing by the interpolation image creating apparatus 100. First, the interpolation image creating apparatus 100 acquires an input image. It is assumed that the apparatus 100 has already acquired the first frame 210 and the frame memory 106 holds the first frame 210. Then, the block creating unit 102 acquires the second frame 220 following the first frame 210 (step S100). Next, the unit 102 divides the second frame 220 to acquire several second blocks 221 to 229 (step S102).

Next, the correlated block extracting unit 108 extracts the most correlated block relative to the second blocks, that is, the first block from the first frame 210 (step S104). Here, the first block and the second block have the same size and shape.

The correlated block extracting unit 108 specifically calculates a difference value between a value of each pixel included in the second blocks and a value of a pixel of a predetermined block in the first frame 210. Then, a block in which a sum of difference values is smallest is extracted as the first block.

As another example, the number of difference values between the value of each pixel included in the second blocks and the value of a pixel of the predetermined block in the first frame 210, which is not more than the predetermined threshold value, is counted. A block where the counted number is the largest may be assumed as the first block.

Next, the partial area specifying unit 120 specifies a high-correlated partial area and a low-correlated partial area in the first block 210 (step S200). The high-correlated partial area is an area including a pixel indicative of the correlation value equal to or more than the threshold value in the first block. The low-correlated partial area is an area including a pixel indicative of the correlation value smaller than the threshold value in the first block.

Figure 5:
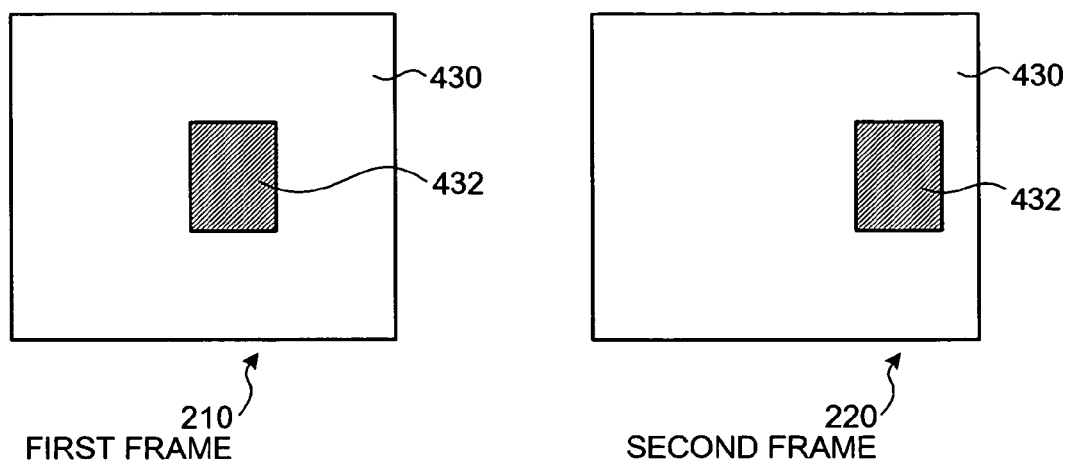
FIG. 5 is a diagram showing images contained in a first frame and a second frame.

Here, the high-correlated partial area and the low-correlated partial area will be described with reference to FIGS. 5 to 9. There will be described a case where the second block can be divided in the high-correlated partial area and the low-correlated partial area, but the entire second block may be the high-correlated partial area. FIG. 5 shows images included in the first frame 210 and the second frame 220. The first frame 210 shown in FIG. 5 includes a background area 430 and a rectangular moving object 432 moving on the background area 430 in a horizontal direction of the frame. The background area 430 is a still image. The second frame 220 includes the background area 430 and the moving object 432 similarly as the first frame 210. In the second frame 220, the moving object 432 is moving rightward than the position of the moving object 432 in the first frame 210.

Figure 6:
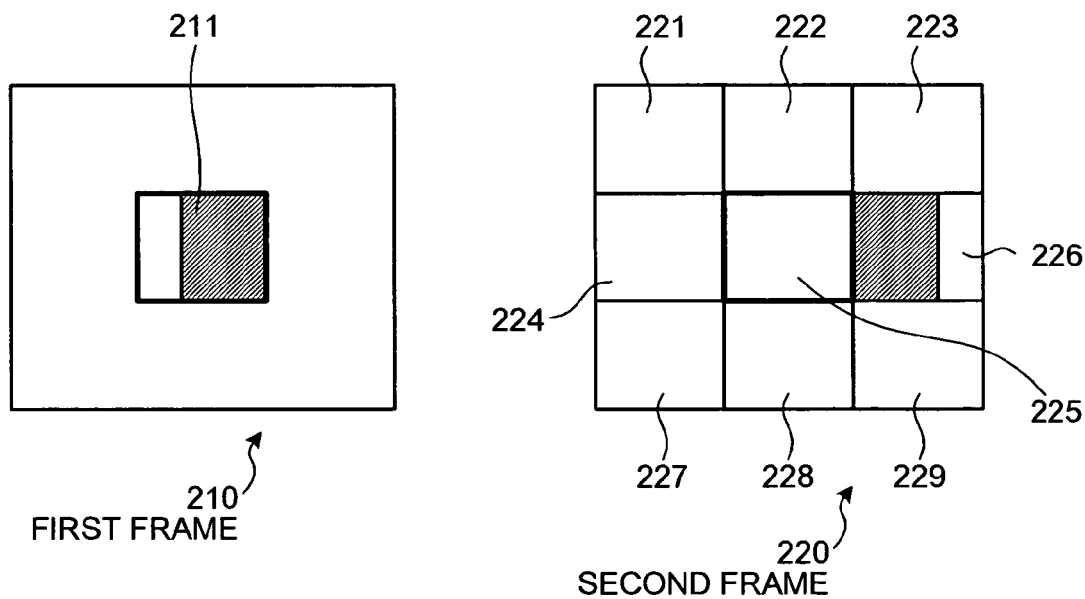
FIG. 6 is a diagram showing the most correlated areas with a second block in the second frame.
Figure 7:
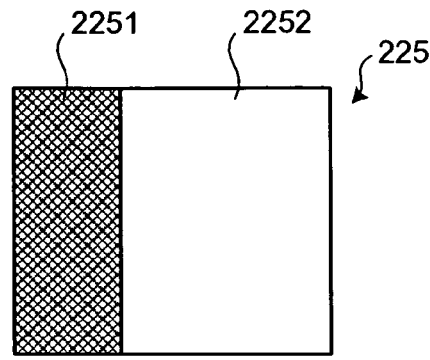
FIG. 7 is a diagram showing the second block.

As shown in FIG. 6, for example, an area which is the most correlated with the second block 225 in the second frame 220 is an area 211 in the first frame 210. Images thereof match only in the background 430. Thus, this area is the high-correlated partial area. Other area is the low-correlated partial area. In other words, as shown in FIG. 7, the second block 225 is divided into a high-correlated partial area 2251 and a low-correlated partial area 2252.

Figure 8:
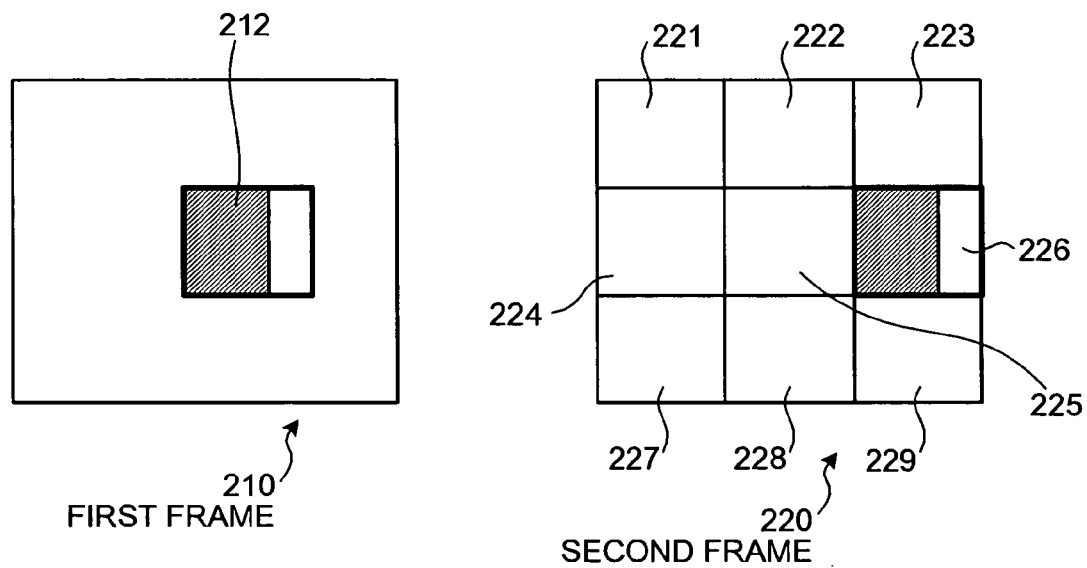
FIG. 8 is a diagram showing the most correlated areas with a second block in the second frame.
Figure 9:
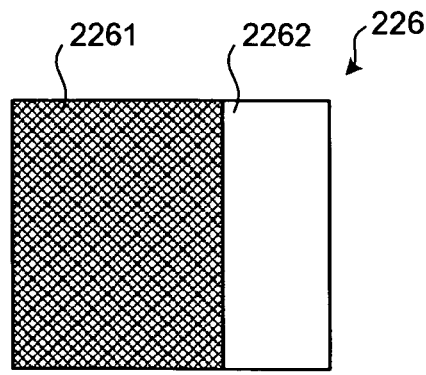
FIG. 9 is a diagram showing the second block.

As shown in FIG. 8, an area which is the most correlated with the second block 226 in the second frame 220 is an area 212 in the first frame 210. Images thereof match only in the moving object 432. Thus, this area is the high-correlated partial area. Other area is the low-correlated partial area. In other words, as shown in FIG. 9, the second block 226 is divided in a high-correlated partial area 2261 and a low-correlated partial area 2262.

The explanation returns to FIG. 4. When the target partial area is the high-correlated partial area (step S202, YES), the high-correlated partial area motion vector calculating unit 124 calculates the high-correlated partial area motion vector between the high-correlated partial area and an area corresponding to the high-correlated partial area (step S204). Here, the area corresponding to the high-correlated partial area is an area in the first frame 210, and has the same shape and size as the high-correlated partial area.

In the example explained in FIGS. 5 to 9, a motion vector for the high-correlated partial area 2251 and a motion vector for the high-correlated partial area 2261 are calculated.

Next, the motion compensating unit 130 creates an image of a predetermined area in the interpolation frame based on the high-correlated partial area obtained by the partial area specifying unit 120, the area in the first frame 210 corresponding to the high-correlated partial area and the high-correlated partial area motion vector calculated by the high-correlated partial area motion vector calculating unit 124 (step S206).

Figure 10:
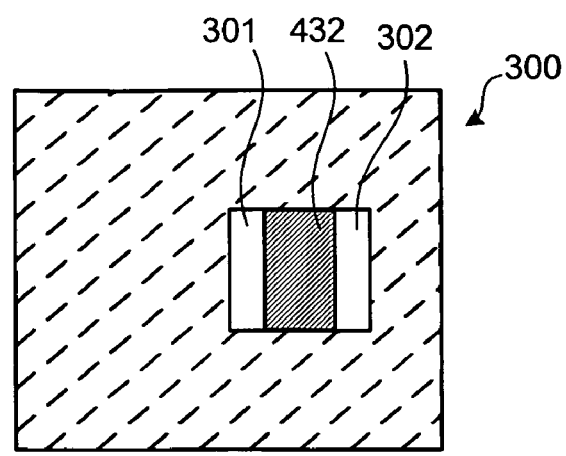
FIG. 10 is a diagram showing an interpolation frame.

FIG. 10 shows the interpolation frame 300 created by the above processing. As described above, in the interpolation frame 300, the moving object 432 is arranged between the moving object 432 in the first frame 210 and the moving object 432 in the second frame 220. In the processings in step S204 and step S206, an image is not allocated to the areas 301 and 302 at both sides of the moving object 432.

When the target partial area is the low-correlated partial area (step S202, NO), the low-correlated partial area motion vector calculating unit 128 extracts an area corresponding to the low-correlated partial area from other frame (step S220). In the present embodiment, the unit 128 extracts it from the third frame 230. Next, the low-correlated partial area motion vector calculating unit 128 calculates a low-correlated partial area motion vector between the low-correlated partial area and the corresponding area extracted from the third-frame 230 (step S222). Here, the corresponding area has the same shape and size as the low-correlated partial area.

In the example explained in FIGS. 5 to 9, a motion vector for the low-correlated partial area 2252 and a motion vector for the low-correlated partial area 2262 are calculated.

A processing by the low-correlated partial area motion vector calculating unit 128 in step S220 will be described in detail. As described using FIG. 10, the areas 301 and 302 to which an image is not allocated remain on part of the interpolation frame 300.

This area is an area which cannot be determined by the first frame 210, the second frame 220 and the motion vector therebetween, that is, an occlusion area. The occlusion area appears, for example, when an object or background hidden by another object in the first frame appears in the second frame. In order to create an image of this area, it is necessary to extract the area corresponding to the low-correlated partial area.

In the first frame 210, for example, the moving object 432 is overlapped on the area where the same background 430 as the background 430 indicated in the low-correlated partial area 2252 is to be present. Therefore, the same image as the low-correlated partial area 2252 is not present in the first frame 210.

However, since the moving object 432 is continuously moving, the same background 430 as the background 430 indicated in the low-correlated partial area 2252 is included in the frame other than the first frame 210. In other words, the same image can be extracted from the frame other than the first frame 210.

The interpolation image creating apparatus 100 according to the present embodiment extracts an area including the same background 430 as the low-correlated partial area 2252 (the same shape and size) from the frame other than the first frame 210 and the second frame 220 in the present embodiment, the same background 430 as the low-correlated partial area 2252 is extracted from the third frame 230 following the second frame 220.

Although the third frame 230 following the second frame 220 is assumed as a target to detect in the first embodiment, the target frame may be a frame other than the first frame 210 and the second frame 220 or a frame in a direction temporally opposite to the first frame 210 with the second frame 220 as a reference, and is not limited to the third frame 230.

Next, the motion compensating unit 130 allocates an image to a predetermined area in the interpolation frame 300 based on the low-correlated partial area motion vector calculated by the low-correlated partial area motion vector calculating unit 128, the low-correlated partial area, and the corresponding area in the third frame 230 (step S224).

When creating an interpolation frame between two frames, frames other than the two frames are referred to, thereby allocating an image also to the occlusion of the interpolation frame with good accuracy.

Figure 11:
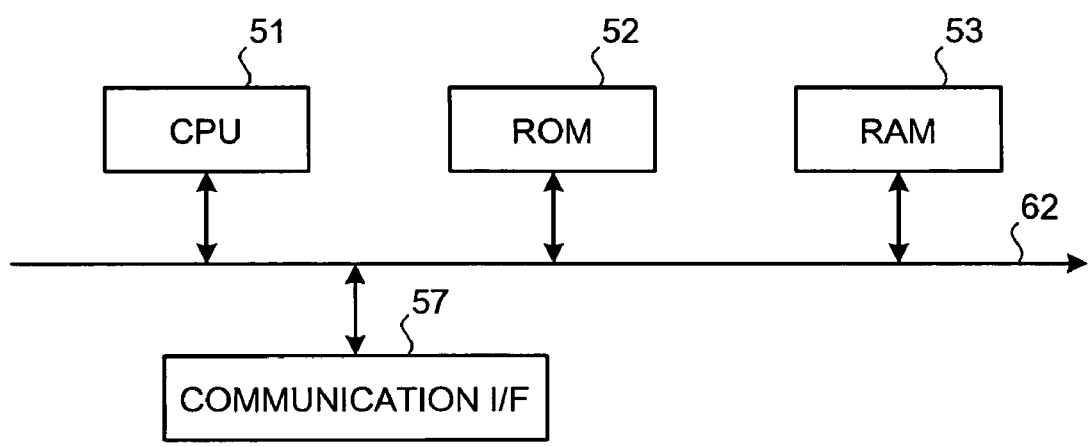
FIG. 11 is a diagram showing a hardware structure of the interpolation image creating apparatus according to a first embodiment.

FIG. 11 is a diagram showing a hardware configuration of the interpolation image creating apparatus 100 according to the first embodiment. The interpolation image creating apparatus 100 includes, as hardware constituents, a ROM 52 in which an interpolation image creating program for executing an interpolation image creating processing in the interpolation image creating apparatus 100 is stored, a CPU 51 for controlling each unit in the interpolation image creating apparatus 100 according to the program in the ROM 52, a RAM 53 for storing therein various items of data required for controlling the interpolation image creating apparatus 100, a communication I/F 57 for connecting to a network to make communication, and a bus 62 for connecting the respective units.

The aforementioned interpolation frame generating program in the interpolation image creating apparatus 100 may be recorded in a computer readable recording medium such as CD-ROM, floppy (trademark) disk (FD) or DVD with a file in an installable form or executable form, and provided.

In this case, the interpolation frame generating program is read from the recording medium and executed in the interpolation image creating apparatus 100 to be loaded on the main storage device so that each unit described in the software configuration is generated on the main storage device.

The interpolation frame generating program according to the first embodiment may be stored on the computer connected to the network such as the Internet and downloaded via the network to be provided.

The apparatus has been described using the embodiment of the present invention, but the above embodiment may be variously modified or improved.

As a first modification, in the present embodiment, the block is divided in the high-correlated partial area and the low-correlated partial area, and the motion vector is allocated to each partial area, but the motion vector may be allocated on a block basis instead. In other words, whether each block is high-correlated or low-correlated is determined. The high-correlated partial area motion vector calculating unit 124 calculates the motion vector for the high-correlated block determined to be high-correlated. The low-correlated partial area motion vector calculating unit 128 calculates the motion vector for the low-correlated block determined to be low-correlated.

As a second modification, the low-correlated partial area may be further divided in a high-correlated area and a low-correlated area, and the high-correlated partial area motion vector calculating unit 124 and the low-correlated partial area motion vector calculating unit 128 may calculate the motion vectors for the respective areas.

Further, the processings such as motion estimation, correlation determination and motion vector calculation may be recursively performed for the low-correlated area such that the low-correlated partial area may be further divided in a high-correlated area and a low-correlated area, and the low-correlated area obtained at this time may be further divided in a high-correlated area and a low-correlated area.

Next, an interpolation image crating apparatus 100 according to a second embodiment will be described. The interpolation image crating apparatus 100 according to the second embodiment creates an interpolation frame 300 by dividing the interpolation frame 300 into blocks and searching high-correlated areas from a first frame 210 and a second frame 220 with the interpolation frame 300 as a reference. It is different in this point from the interpolation image crating apparatus 100 according to the first embodiment.

A block creating unit 102 divides the interpolation frame 300 to be interpolated into several blocks to be interpolated, which are arranged in matrix, and obtains several interpolation blocks. A correlated block extracting unit 108 performs correlation calculation on the areas on the line through each block to be interpolated in the first frame 210 and the second frame 220. Thus, a pair of most correlated areas is extracted.

Figure 12:
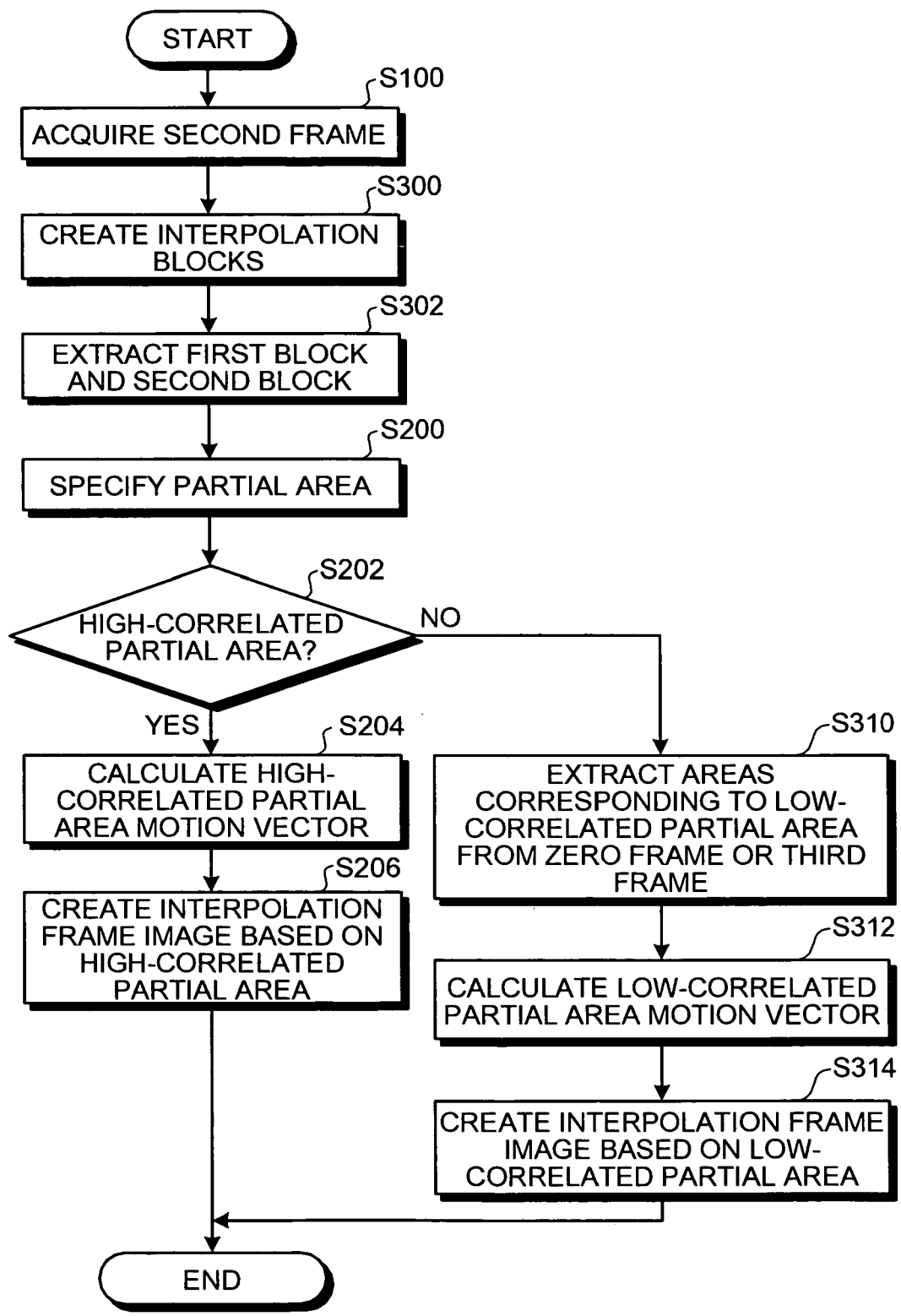
FIG. 12 is a flowchart showing an interpolation image creating processing of the interpolation image creating apparatus 100 according to a second embodiment.

FIG. 12 is a flowchart showing an interpolation image creating processing of the interpolation image crating apparatus 100 according to the second embodiment. After acquiring the second frame 220, the correlated block extracting unit 108 divides the interpolation frame 300 and obtains several interpolation blocks (step S300). Next, a first block and a second block having the same size and shape as the blocks to be interpolated are extracted from the first frame 210 and the second frame 220 (step S302). Here, the first block and the second block are high-correlated blocks.

Figure 13:
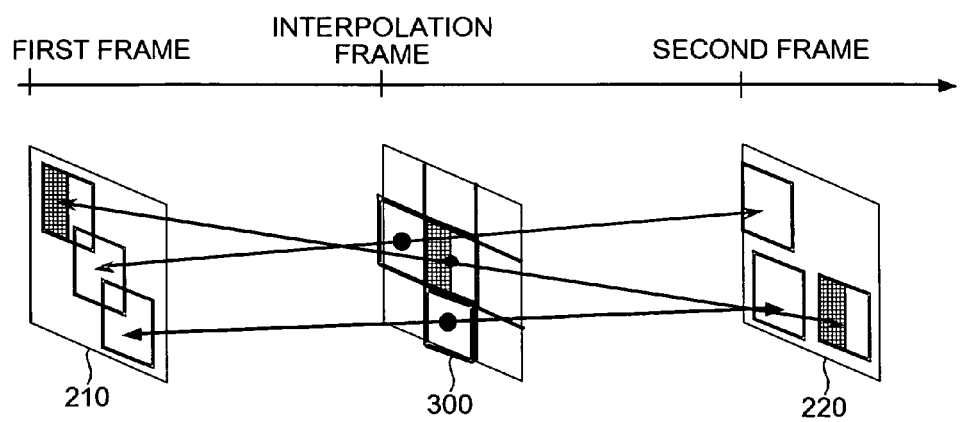
FIG. 13 is a diagram for explaining a processing of extracting a first block and a second block.

FIG. 13 is a diagram for explaining a processing of extracting the first block and the second block. As shown in FIG. 13, a pair of areas on the line through each interpolation block in the interpolation frame 300 is extracted as the first block and the second block from the first block and the second block. In other words, the first block and the second block arranged at a position corresponding to the first block with the interpolation block as a reference are extracted.

A pair of first block and second block has many candidates. A block pair of a first block 212 and a second block 222 is selected from many candidates by a method for determining the most correlated block described in the first embodiment.

In step S200, a high-correlated partial area and a low-correlated partial area in the block are specified in the block pair obtained in step S302. When the area to be processed is the high-correlated partial area (step S202, Yes), the processings in step S204 and step S206 are performed.

On the other hand, when the area to be processed is the low-correlated partial area (step S202, NO), the low-correlated partial area motion vector calculating unit 128 extracts an area corresponding to the low-correlated partial area from other frame (step S310). In the present embodiment, it is extracted using a zero frame 200 or the third frame 230. The area to be extracted is an area having the same size and shape as the low-correlated partial area.

Next, the low-correlated partial area motion vector calculating unit 128 calculates a motion vector between the low-correlated partial area and the area extracted from the zero frame 200 or a third frame 230 (step S213). Then, a motion compensating unit 130 allocates an image to a predetermined area in the interpolation frame 300 based on the low-correlated partial area motion vector calculated by a low-correlated partial area motion vector calculating unit 128, the low-correlated partial area and the corresponding area (step S314).

Figure 14:
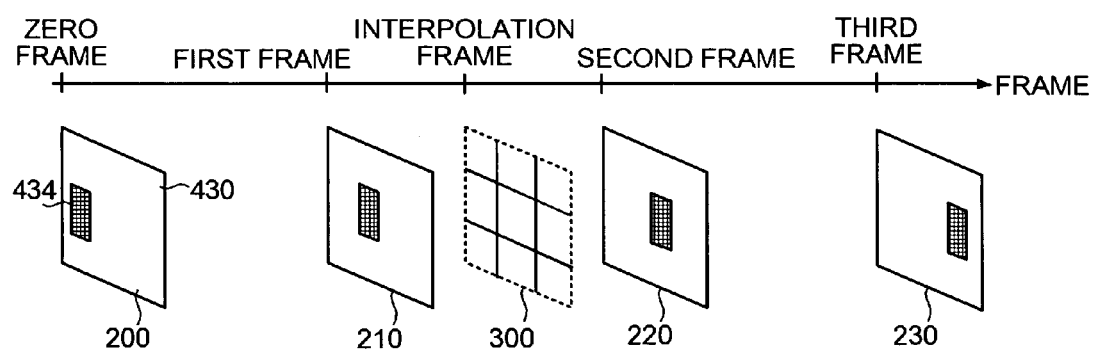
FIG. 14 is a diagram for explaining a processing (step S310 to step S314) for a low-correlated area.
Figure 15:
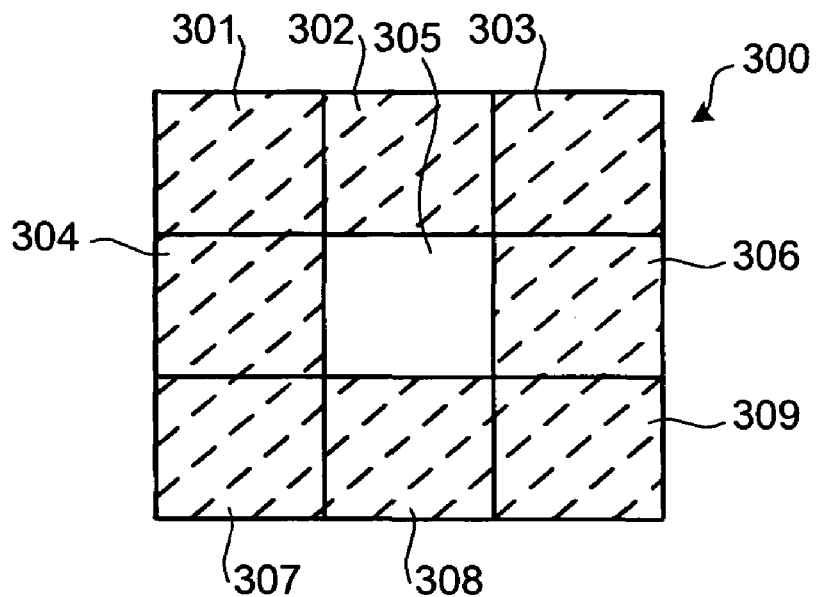
FIG. 15 is a diagram for explaining the processing (step S310 to step S314) for a low-correlated area.

FIGS. 14 and 15 are diagrams for explaining a processing for the low-correlated partial area (step S310 to step S314). As shown in FIG. 14, it is assumed that a moving object 434 is moving from the left to the right on the frame over the zero frame 200 to the third frame 230. In this case, as shown in FIG. 15, interpolation blocks 301, 302, 303, 304, 306, 307, 308, and 309 in the interpolation frame 300 are in the high-correlated area. A background 430 is allocated to the area by the processings in step S204 and step S206.

Figure 16:
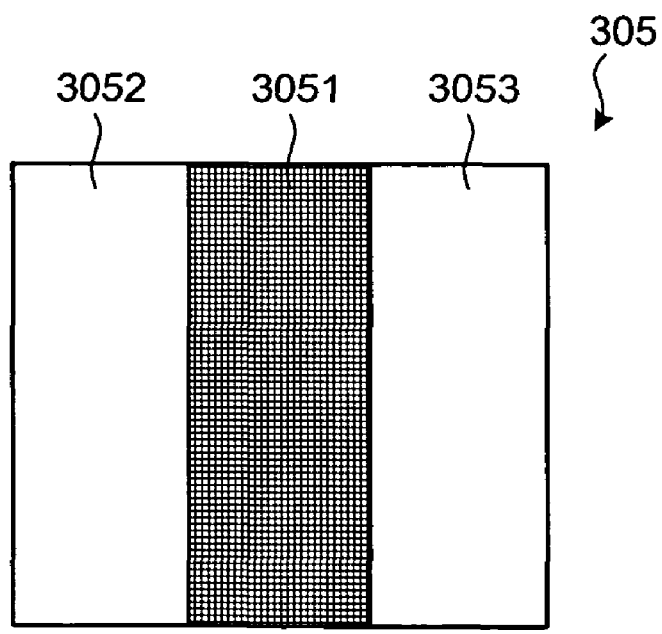
FIG. 16 is a diagram showing an interpolation block.

FIG. 16 shows the interpolation block 305 shown in FIG. 15. An area 3051 at the center of the block 305 to be interpolated is a high-correlated area. The moving object 434 is allocated to this area by the processings in step S204 and step S206.

Areas 3052 and 3053 at both sides of the interpolation block 305 are areas corresponding to the low-correlated partial area, and are occlusions. The background 430 is allocated to the areas by the processing from step S310 to step S314 by utilizing the zero frame 200 and the third frame 230.

The image to be allocated to the areas 3052 and 3053 is present in the zero frame 200 or the third frame 230. Therefore, an image present in the zero frame 200 or the third frame 230 may be allocated. There is further performed a processing of determining whether an image in the zero frame 200 or the third frame 230 is allocated.

In other words, the high-correlated partial areas in the first frame 210 and the second frame 220 are masked. Then, a correlation between an unmasked area, that is, the low-correlated partial area and the outer frame thereof (the zero frame 200 or the third frame 230) is determined to specify an image to be allocated to the areas 3052 and 3053.

Figure 17:
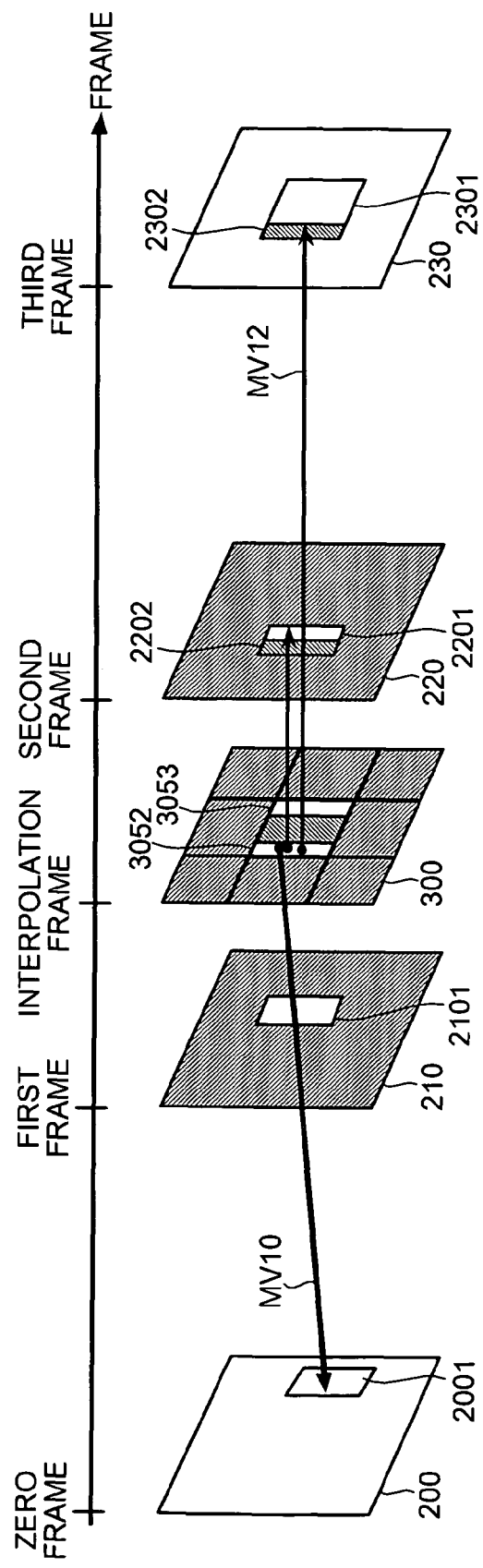
FIG. 17 is a diagram for explaining a processing of allocating an image to an area.

FIG. 17 is a diagram for explaining a processing of allocating an image to the area 3052. When specifying an image to be allocated to the area 3052, matching between a low-correlated partial area 2101 in the first frame 210 and the predetermined area in the zero frame 200 is performed with the area 3052 as a reference. Further, assuming that the area 3052 is a reference, matching between the low-correlated partial area 2101 in the second frame 220 and a predetermined area in the third frame 230 is performed.

In the matching between the first frame 210 and the zero frame 200, the area in the first frame 210 is limited only to the low-correlated partial area 2101 by masking. Thus, with the area 3052 in the interpolation frame 300 in the zero frame 200 as a start point, matching is performed only with an area 2001 determined by a motion vector MV10 through the low-correlated partial area 2101 in the first frame 210. In this manner, the first frame 210 is masked so that the matching is limited only to the area 2001 in the zero frame 200. A correlation between the low-correlated partial area 2101 in the first frame 210 and the area 2001 in the zero frame 200 is low.

In the matching between the second frame 220 and the third frame 230, the area in the second frame 220 is limited to a low-correlated partial area 2201 by masking. Thus, with the area 3052 in the interpolation frame 300 in the third frame 230 as a start point, matching is performed only with an area 2301 determined by a motion vector MV12 through the low-correlated partial area 2201 in the second frame 220. In this manner, masking is performed on the second frame 220 so that the matching is limited only to the area 2301 on the third frame 230. An area 2202 on the left of the low-correlated partial area 2201 in the second frame 220 and an area 2302 on the left of the area 2301 in the third frame 230 have the same background 430, and have high correlation.

As described above, it is possible to detect a high-correlated area from only one of the zero frame 200 and the third frame 230. Thus, the high-correlated area is allocated to the area 3052.

In this manner, matching with the outer frame is performed only on the low-correlated partial areas in the first frame 210 and the second frame 220, thereby allocating an appropriate image to the occlusion.

Figure 18:
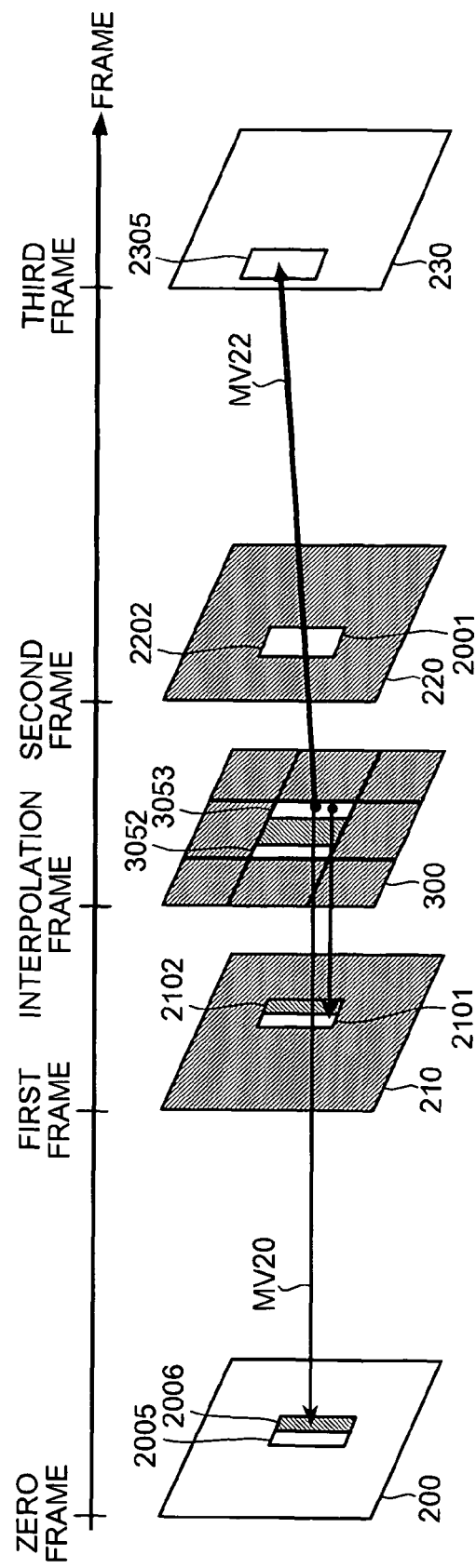
FIG. 18 is a diagram for explaining a processing of allocating an image to another area.

FIG. 18 is a diagram for explaining a processing of allocating an image to the area 3053. Also when specifying an image to be allocated to the area 3053, similarly as in the area 3052, matching between the low-correlated partial area 2101 in the first frame 210 and the area in the zero frame 200 is performed with the area 3053 as a reference. Further, matching between the low-correlated partial area 2201 in the second frame 220 and the area in the third frame 230 is performed with the area 3053 as a reference.

In the matching between the first frame 210 and the zero frame 200, with the area 3053 in the interpolation frame 300 in the zero frame as a start point, matching only with an area 2005 determined by a motion vector MV20 through the low-correlated partial area 2101 in the first frame 210 is performed.

A low-correlated partial area 2102 in the first frame 210, the left area 2302 in the area 2301 in the third frame 230 and a left area 2006 in a area 2005 in the zero frame 200 have the same background 430, and have high correlation.

In the matching between the second frame 220 and the third frame 230, with the area 3053 in the interpolation frame 300 in the third frame 230 as a start point, matching is performed only with the area 2301 determined by a motion vector MV22 through the low-correlated partial area 2201 in the second frame 220. A correlation between the low-correlated partial area 2201 in the second frame 220 and the area 2301 in the third-frame 230 is low. As described above, the area 2102 in the first frame 210 and the area 2006 in the zero frame, which have high correlation, are allocated to the area 3053.

When an appropriate motion vector for the area to which an image is not allocated is not specified even with reference to other frame, an average value or median value of the motion vector given to the area around the area where an image is not allocated may be assumed as a motion vector for this area to generate an image for this area.

In the interpolation image creating apparatus 100 according to the second embodiment, there has been described the case where images corresponding to two different motion vectors are present in one block, but the present invention is not limited thereto.

For example, when images corresponding to more than three different motion vectors are present in one block, the motion vectors corresponding thereto may be only calculated. Further, partial areas corresponding thereto may be only extracted. Thus, it is possible to create an interpolation frame with high accuracy from two frames where images corresponding to several motion vectors are present.

Furthermore, several motion vectors may be given to one area. In this case, an average value of images in the reference frame, which are specified by the several given motion vectors, respectively, is allocated to the interpolation frame.

As other example, a motion vector may be selected by a correlation value between the areas specified by the several given motion vectors. Specifically, areas to be specified by the given motion vectors are specified in several reference frames. For example, the areas are specified in two reference frames. Then, a correlation value between the several specified areas is found. This is performed on the respective given motion vectors. A motion vector corresponding to the smallest correlation value is selected. An image is allocated to the area based on the selected motion vector.

Figure 19:
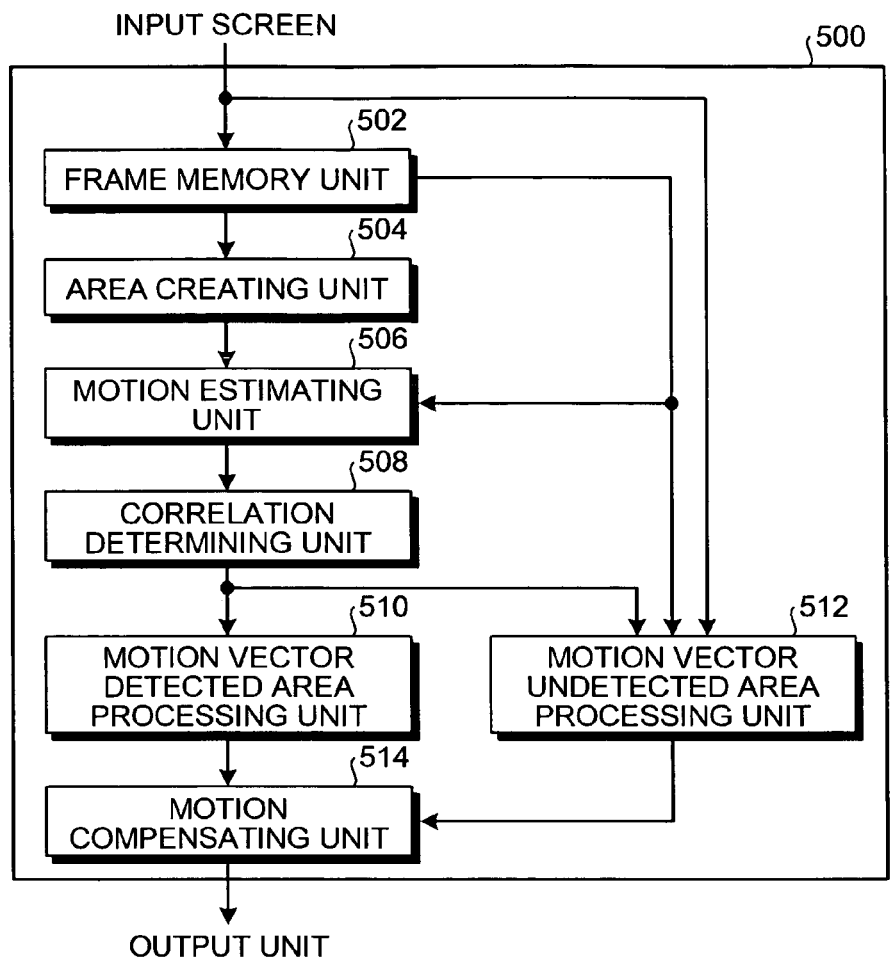
FIG. 19 is a block diagram showing the entire structure of an interpolation image creating apparatus according to a third embodiment.

FIG. 19 is a block diagram showing the entire structure of an interpolation image creating apparatus 500 according to a third embodiment. The interpolation image creating apparatus 500 according to the third embodiment gives a motion vector to a motion vector undetected area based on a motion vector around a low-correlated area, that is, a motion vector undetected area.

The interpolation image creating apparatus 500 includes a frame memory unit 502, an area crating unit 504, a motion estimating unit 506, a correlation determining unit 508, a motion vector detected area processing unit 510, a motion vector undetected area processing unit 512 and a motion compensating unit 514.

Figure 20:
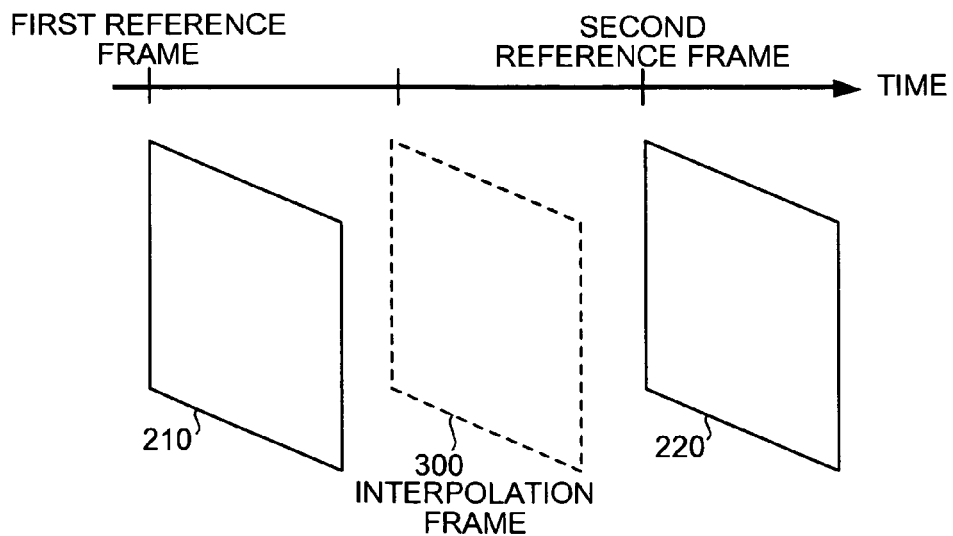
FIG. 20 is a diagram for explaining an interpolation frame.

FIG. 20 is a diagram for explaining an interpolation frame. FIG. 20 shows two consecutive reference frames included in an input image, that is, a first reference frame 210 and a second reference frame 220. There will be described a case of creating an interpolation frame 300 for interpolating between the first reference frame 210 and the second reference frame 220.

There will be here described a case of creating an interpolation frame between the two consecutive frames, that is, between the first reference frame 210 and the second reference frame 220, but an interpolation frame to be created by the interpolation image creating apparatus may be a frame for interpolating between two different reference frames and is not limited to the present embodiment.

The area creating unit 504 extracts the first reference frame 210 from the frame memory unit 502. Then it divides the first reference frame 210 into reference areas constituted of several pixels.

Figure 21:
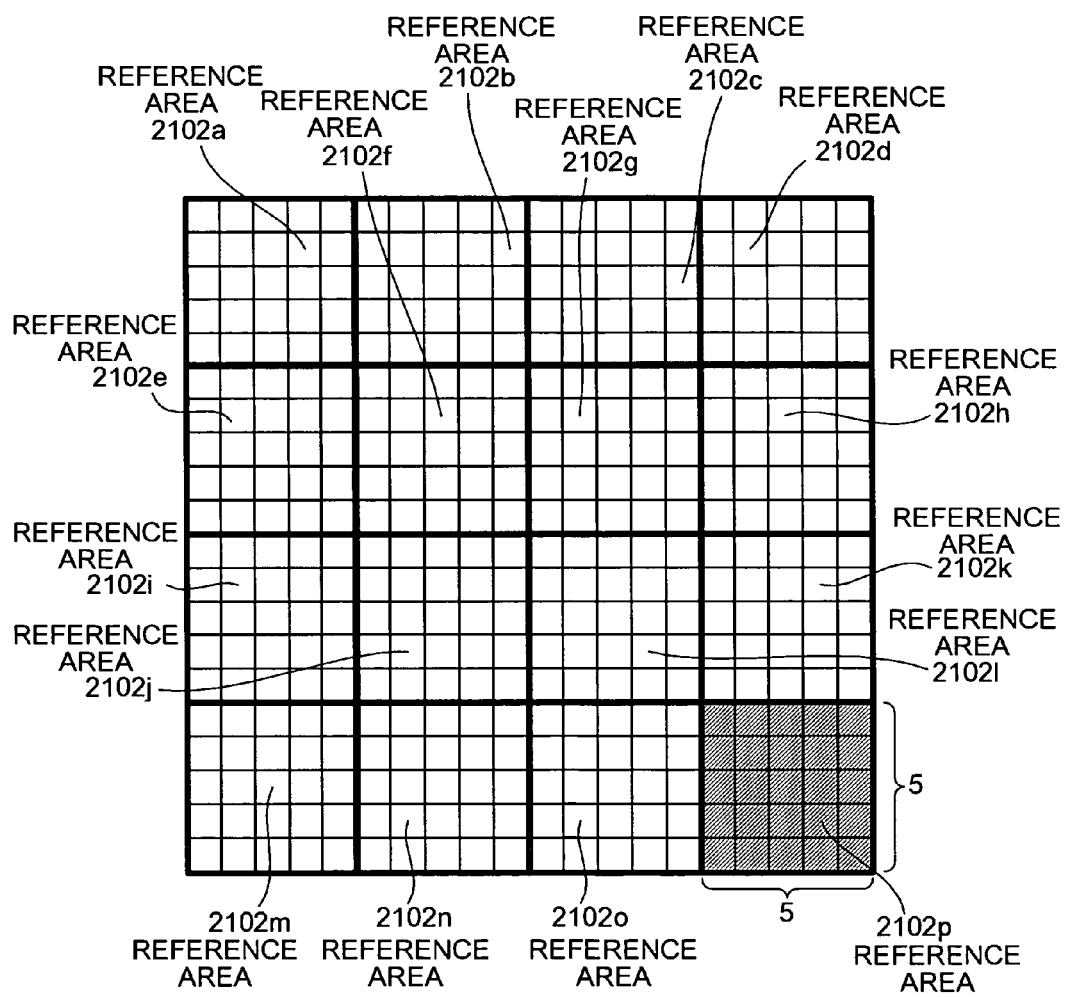
FIG. 21 is a diagram for explaining reference areas.

FIG. 21 is a diagram for explaining a reference area. In the present embodiment, the area creating unit 504 divides the frame into square areas each constituted of five vertical pixels by five horizontal pixels as shown in FIG. 21. In other words, the first reference frame 210 is divided into 16 reference areas from a reference area 2102a to a reference area 2102p. The shape and size of the reference area is not limited to that in the present embodiment, and may be different from that in the present embodiment.

The motion estimating unit 506 calculates respective motion vectors of several reference areas in the first reference frame 210 based on the second reference frame 220. The correlation determining unit 508 determines a correlation between a predetermined area in the second reference frame 220 and each of several reference areas in the first reference frame 210.

The motion vector detected area processing unit 510 performs a processing for an area in the reference areas, which is determined to be high-correlated by the correlation determining unit 508, that is, for a motion vector detected area. The motion vector undetected area processing unit 512 performs a processing for an area in the reference areas, which is determined to be low-correlated by the correlation determining unit 508, that is, for a motion vector undetected area. The motion compensating unit 514 creates an image of a predetermined area of the interpolation image creating apparatus 500 based on the processings by the motion vector detected/undetected area processing units 510 and 512.

Figure 22:
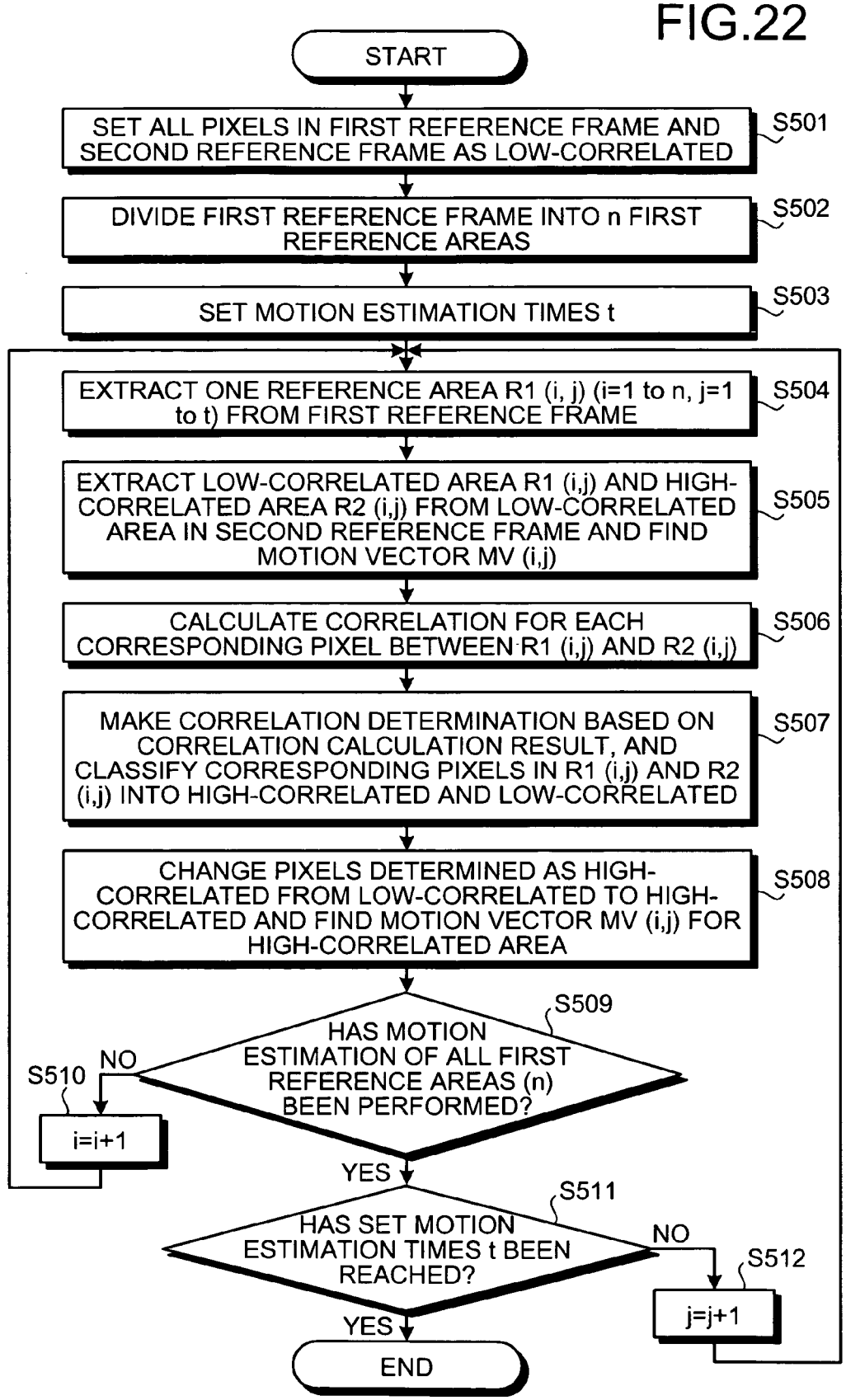
FIG. 22 is a flowchart showing a high-correlated area motion vector allocating processing by the interpolation image creating apparatus according to the third embodiment.

FIG. 22 is a flowchart showing a high-correlated area motion vector allocating processing by the interpolation image crating apparatus 500 according to the third embodiment. A correlation determination initializing step S501 assumes all the pixels in the input reference frame as "low-correlated."

First, set all the pixels in the first reference frame 210 and the second reference frame 220 as low-correlated (step S501). Next, divide the first reference frame 210 into n reference areas (step S502). As shown in FIG. 21, the first reference frame 210 is divided into 16 reference areas in the present embodiment.

Next, set the motion estimation times t (step S503). Here, the motion estimation times t is the number of times of processings from the reference area extracting processing (step S504) to the correlation determining processing (step S507) described below.

The interpolation image crating apparatus 500 according to the present embodiment divides the reference area into a high-correlated area and a low-correlated area. The resultant low-correlated area is further divided into a high-correlated area and a low-correlated area. As described above, a processing of dividing the reference areas into finer areas is repeated. In other words, a recursive processing is performed. The motion estimation times t corresponds to the number of times of this processing. In the present embodiment, the motion estimation times t is set to two (2), and a counter indicative of the current motion estimation times is set to one (1) at the same time. When the motion estimation times t is set to two (2), the processing after step S504 is performed twice.

The motion estimation times t may be naturally set to one. Thus, the entire reference area becomes the high-correlated area or the low-correlated area. As other example, the motion estimation times t may not be set. Instead, the processing may be automatically repeated until no high-correlated area is detected in the reference areas.

Next, extract a reference area to be subjected to the motion estimating processing (step S504). In the present embodiment, there are 16 reference areas as shown in FIG. 21. Therefore, the number n of reference areas is set to 16. The counter t indicative of the current motion estimation times is set to 1.

Next, extract a low-correlated area in the reference area extracted to be processed in the reference area extracting processing (step S504) (hereinafter, referred to as "first reference area"), which is set as low-correlated, and a high-correlated area from the low-correlated area set as low-correlated in the second reference frame 220 (step S505). The extracted areas are referred to as second reference areas.

Specifically, several areas having the same size and shape as the first reference area are set in the low-correlated area in the second reference frame. A sum of absolute difference values is calculated in each area and an area where the sum is the smallest is extracted as the second reference area. The absolute difference value is an absolute value of a difference value between pixels in the second reference area and pixels in the first reference area corresponding to the pixels.

As other example, the number of pixels, at which the absolute difference value for each pixel corresponding to the first reference area and a predetermined area in the second reference frame 220 is not more than a predetermined threshold value, is counted, and an area where the counted number is the largest may be extracted as the second reference area.

Since all the pixels are set as low-correlated in the low-correlation setting processing (step S501), when the processing of extracting a high-correlated area at the first time is performed (step S505), all the reference areas are set as low-correlated, and all the areas in the second reference frame are set as low-correlated.

Then, the low-correlated area in the first reference frame 210 and the low-correlated area in the second reference frame 220 are utilized to find a motion vector MV (step S505). The high-correlated area in the second reference frame 220 is not utilized t this time. Thus, a more appropriate motion vector can be calculated.

Figure 23:
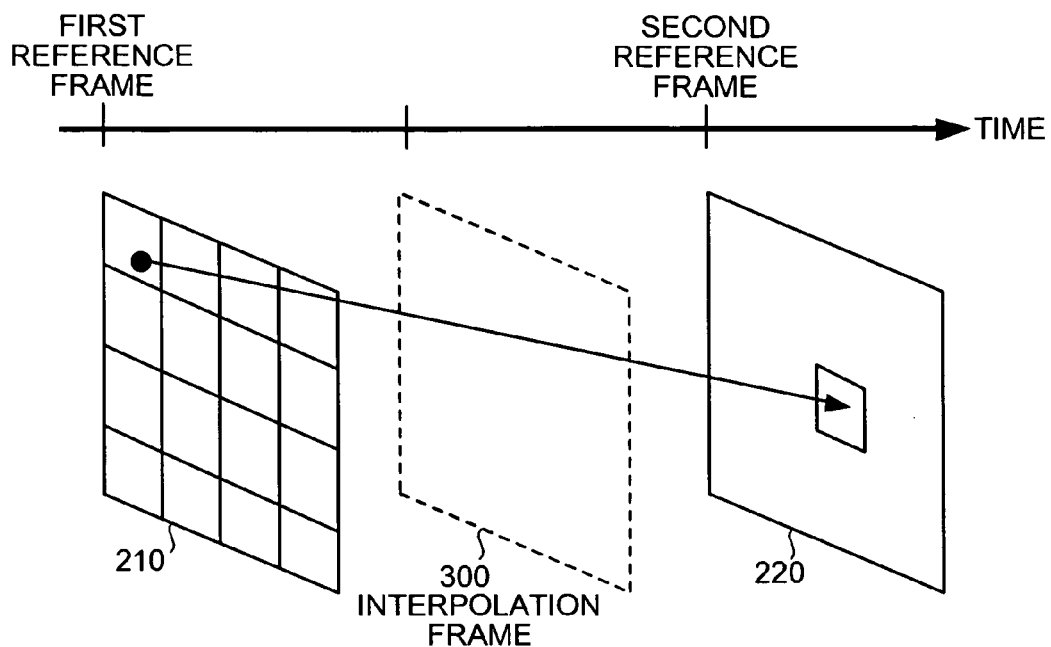
FIG. 23 is a diagram for explaining a processing of finding a reference area on the first reference frame and an area position (motion vector) most correlated with the reference area on the first reference frame within the second reference frame, and calculating a motion vector therebetween.

In the present embodiment, as shown in FIG. 23, the most correlated area position (motion vector) in the second reference frame 220 is found for the reference area in the first reference frame 210 and a motion vector therebetween is calculated. In the first recursive processing (t=1), since all the pixels in the reference area on the first reference frame 210 (block constituted of square area formed of five vertical pixels by five horizontal pixels) are "low-correlated," correlation calculation identical to general block matching is performed.

Next, correlation calculation for each corresponding pixel is performed (step S506) in order to determine a correlation on pixel basis in the area for the first reference area and the second reference area extracted in the motion estimating processing (step S505). In the present embodiment, the absolute difference value is calculated as the correlation value.

Next, correlation determination on pixel basis is made based on the correlation calculation result in the in-area correlation calculation (step S506) and the first reference area and the second reference area are classified into a high-correlated area and a low-correlated area (step S507). The setting of pixel determined as high-correlated is changed from "low-correlated" to "high-correlated," and the motion vector MV found in the motion estimating processing (step S505) is given to the high-correlated area (step S508).

The above processing is performed on all the first reference areas (16 areas) in the first reference frame 210, and is repeated as often as the motion estimation times t (steps S509, S510). The high-correlated area motion vector allocating processing is completed.

Figure 24:
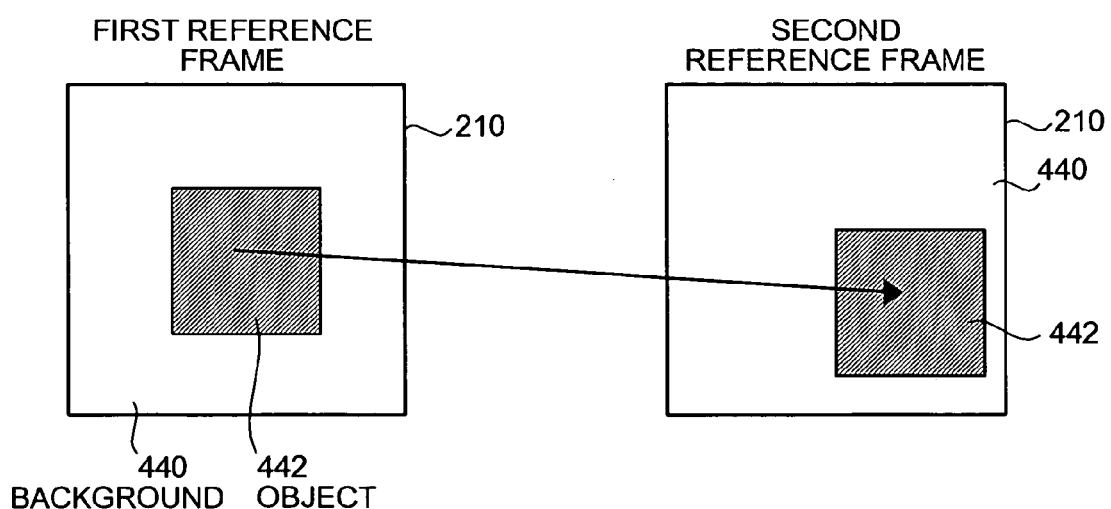
FIG. 24 is a diagram showing the frames between which an object is moving on a still background.

Hereinafter, there will be specifically described a processing after the processing target reference area extracting processing (step S504). FIG. 24 is a diagram showing a frame where an object 442 is moving on a still background 440.

FIG. 25 is a diagram showing a second reference area 222f extracted in the motion estimating processing (step S505) for a first reference area 212f extracted in the processing target reference area extracting processing (step S504). In this manner, an area which is the most correlated with the first reference area is extracted as the second reference area.

FIG. 26 is a diagram showing the first reference area 212f and the second reference area 222f extracted in the motion estimating processing (step S505) on pixel basis. Numerals in the figure indicate a luminance value of each pixel. In the in-area correlation calculating step S506, in order to determine a correlation on pixel basis in the reference area, correlation calculation based on the luminance value for each corresponding pixel is performed on a pair of first reference area and second reference area. In the illustrated example, the absolute difference value is calculated as the correlation calculation value.

FIG. 27 is a diagram showing a correlation calculation result. FIG. 28 is a diagram showing the reference area 212f and the reference area 222f classified into the high-correlated area and the low-correlated area based on the correlation calculation result shown in FIG. 27.

For the determination as to high-correlation or low-correlation, a threshold value is set at the absolute difference value calculation result found in the in area correlation calculation (step S506), and when the calculation result is not more than the threshold value, an area is determined as high-correlated, and when the calculation result is more than the threshold value, an area is determined as low-correlated. In the example shown in FIG. 28, a pixel in which the calculation result of the absolute difference value is 24 is determined as low-correlated, and a pixel as zero (0) is determined as high-correlated. Then, the motion vector MV found in the motion estimating processing (step S505) is given to the high-correlated area shown in FIG. 28.

FIG. 29 is a diagram showing the high-correlated areas and the low-correlated areas in the first reference frame 210 and the second reference frame 220. A motion vector giving processing (step S508) from the processing target reference area extracting processing (step S504) is performed from a reference area 212a to a reference area 212p on the first reference frame 210 (step S509), thereby classifying the first reference frame 210 into the high-correlated area and the low-correlated area as shown in FIG. 29.

In the present embodiment, the motion estimation times t is set to two (2) in the motion estimation times setting processing (step S503). Therefore, the processings from step S504 to step S509 are repeated again for the low-correlated area in the first reference frame 210 shown in FIG. 29 (step S511).

Figure 30:
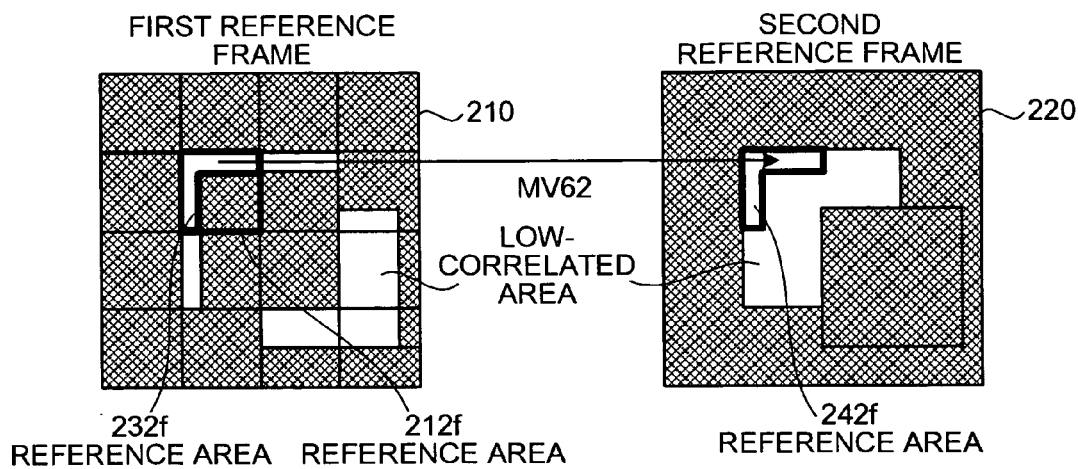
FIG. 30 is a diagram showing a first reference area extracted in a reference area extracting processing (step S504) when the motion estimation times t is two, and a second reference area extracted in the motion estimating processing (step S505) relative to the first reference area.

FIG. 30 is a diagram showing a first reference area 232f extracted in the reference area extracting processing (step S504) when the motion estimation times t is two (2), and a second reference area 242f extracted in the motion estimating processing (step S505) for the first reference area 232f. Here, the first reference area 232f is a low-correlated area in the first reference area 212f set as low-correlated in the correlation classifying processing (step S507) when the motion estimation times t is one (1).

Figure 31:
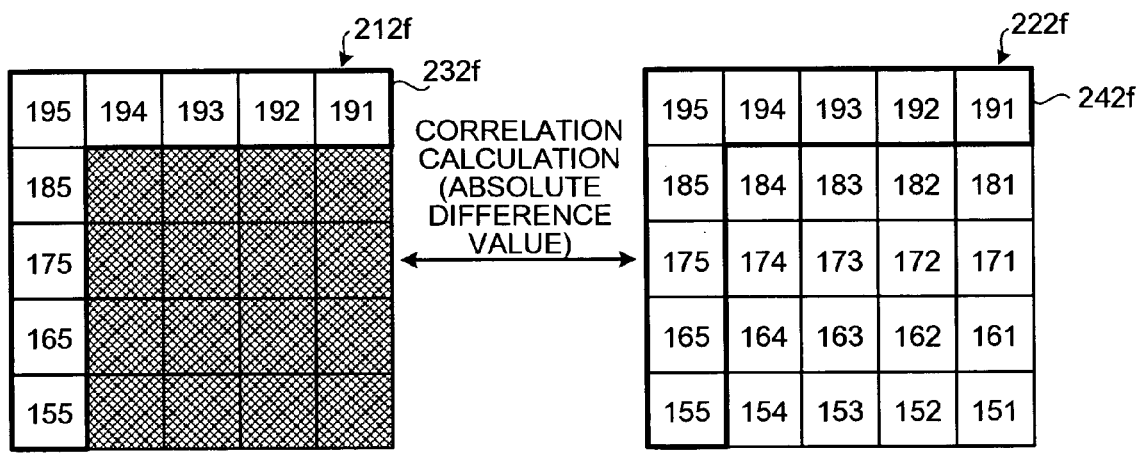
FIG. 31 is a diagram showing a luminance value of each pixel of the first reference area and the second reference area in the second reference frame extracted in the motion estimating processing (step S505)
Figure 32:
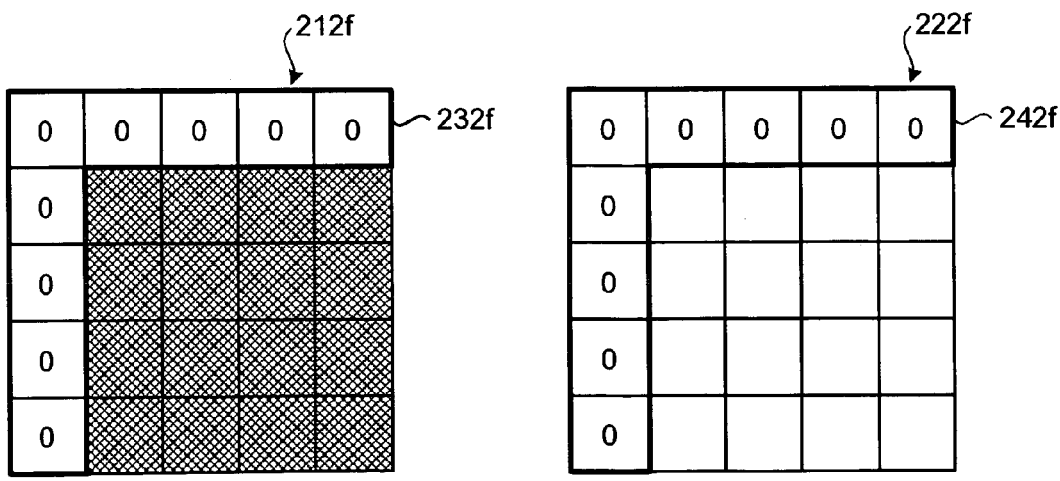
FIG. 32 is a diagram showing correlation calculation values (absolute difference values) in an in-area correlation calculating processing (step S506)

FIG. 31 is a diagram showing a luminance value of each pixel in the first reference area 232f and the second reference area 242f in the second reference frame 220 extracted in the motion estimating processing (step S505). FIG. 32 is a diagram showing a correlation calculation value (absolute difference value) in the in-area correlation calculating processing (step S506).

Figure 33:
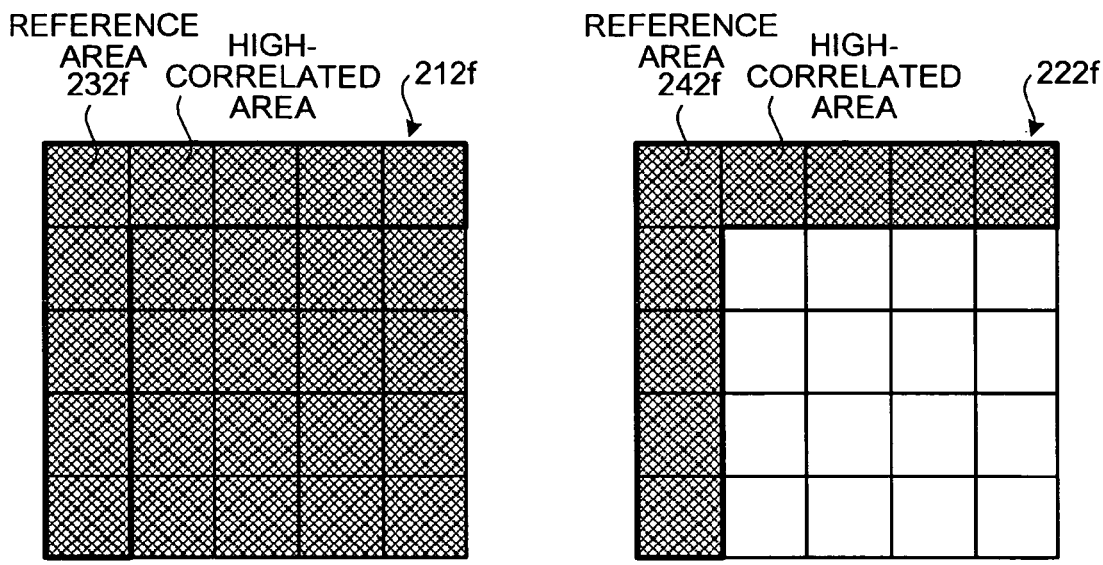
FIG. 33 is a diagram showing high-correlated areas of the first reference area and the second reference area classified in the correlation determining processing (step S507)

FIG. 33 is a diagram showing high-correlated areas in the first reference area 232f and the second reference area 242f classified in the correlation determining processing (step S507). In this example, as shown in FIG. 33, the entire reference areas are the high-correlated areas. The motion vector MV62 found in the motion estimating processing (step S505) is given to the entire reference areas determined as high-correlated. Similarly, the second processing is performed on all the reference areas so that the correlation determining processing is completed.

As described above, even when several motions are included in one reference area, several motion vectors corresponding to the respective motions can be found.

Figure 34:
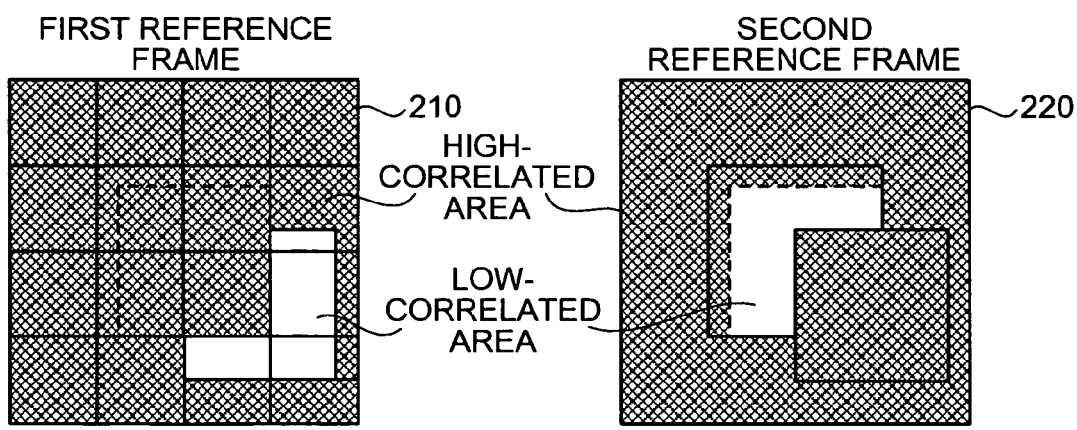
FIG. 34 is a diagram showing a correlation between the first reference frame and the second reference frame when the correlation determining processing is completed.

FIG. 34 is a diagram showing a correlation between the first reference frame 210 and the second reference frame 220 when the correlation determining processing is completed. As shown in FIG. 34, when the reference area is divided and two reference frames are used to find several motion vectors in the reference areas, an area where the motion vector cannot be found, that is, a motion vector undetected area 2104 occurs. The area appears because the background hidden by the object is moved by the object, or disappears because the viewed background is hidden by the object, which is an area where matching between two reference frames cannot be performed and is referred to as an occlusion area. Further, it includes an area where matching between two frames cannot be performed due to noise or the like.

Figure 35:
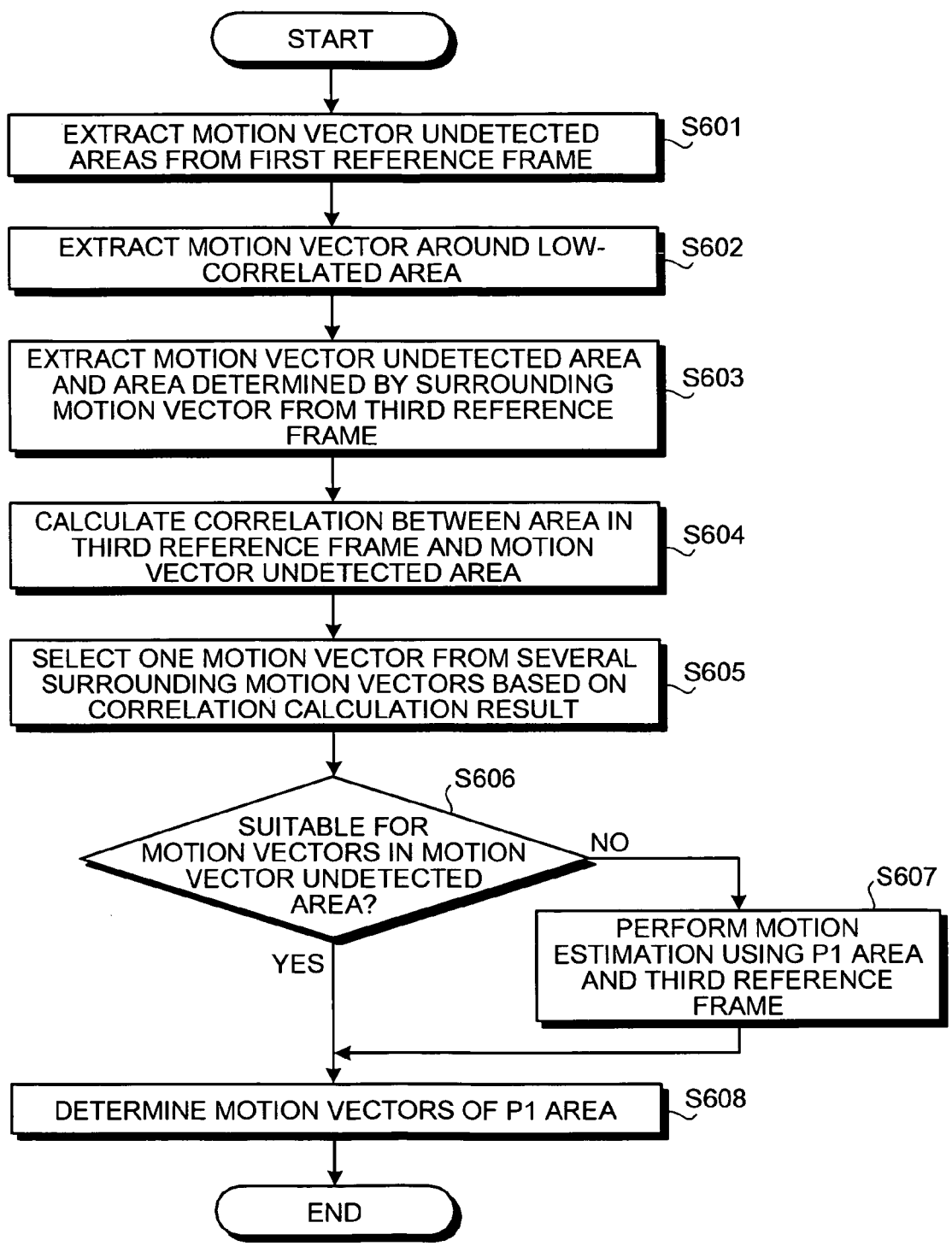
FIG. 35 is a flowchart showing a motion vector undetected area processing by a motion vector undetected area processing unit.

The motion vector undetected area processing unit 512 finds a motion vector of an area where a motion vector could not be found between two frames. FIG. 35 is a flowchart showing the motion vector undetected area processing by the motion vector undetected area processing unit 512. First, the motion vector undetected area processing unit 512 extracts a low-correlated area, that is, a motion vector undetected area from the first reference frame (step S601).

Next, a motion vector allocated to the pixels around the motion vector undetected area 2104 is extracted as a motion vector candidate of the motion vector undetected area 2104 (step S602). The surrounding pixels are preferably pixels adjacent to the motion vector undetected area 2104.

The occlusion area is less likely to have a motion vector different from the surroundings. In other words, the occlusion area is more likely to have the same motion vector as in the area around the occlusion area. Thus, in step S202, a motion vector around the motion vector undetected area 2104 is extracted as the motion vector candidate of the motion vector undetected area.

Figure 36:
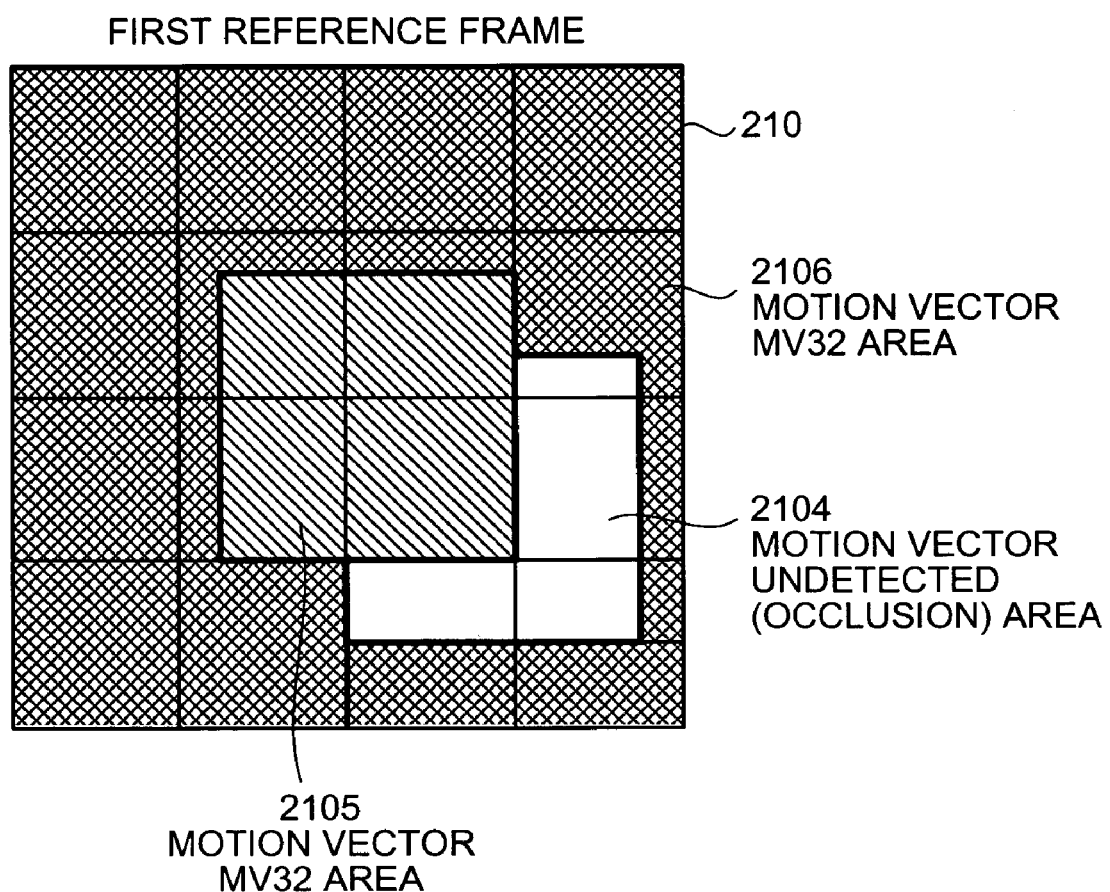
FIG. 36 is a diagram for explaining motion vectors around a motion vector undetected area.

FIG. 36 is a diagram for explaining a motion vector around the motion vector undetected area 2104. As shown in FIG. 36, the motion vector around the motion vector undetected area 2104 includes a motion vector MV30 of the area 2105 corresponding to the object 442 and a motion vector MV32 of the high-correlated area 2106 corresponding to the background 440. Any one of them is allocated to the motion vector undetected area 2104.

The explanation returns to FIG. 35. After extracting the surrounding motion vector, extract the motion vector undetected area 2104 on the first reference frame 210, and an area in the third reference frame 230 specified by a vector obtained by multiplying the surrounding motion vector extracted in step S602 by −1 (step S603).

Figure 37:
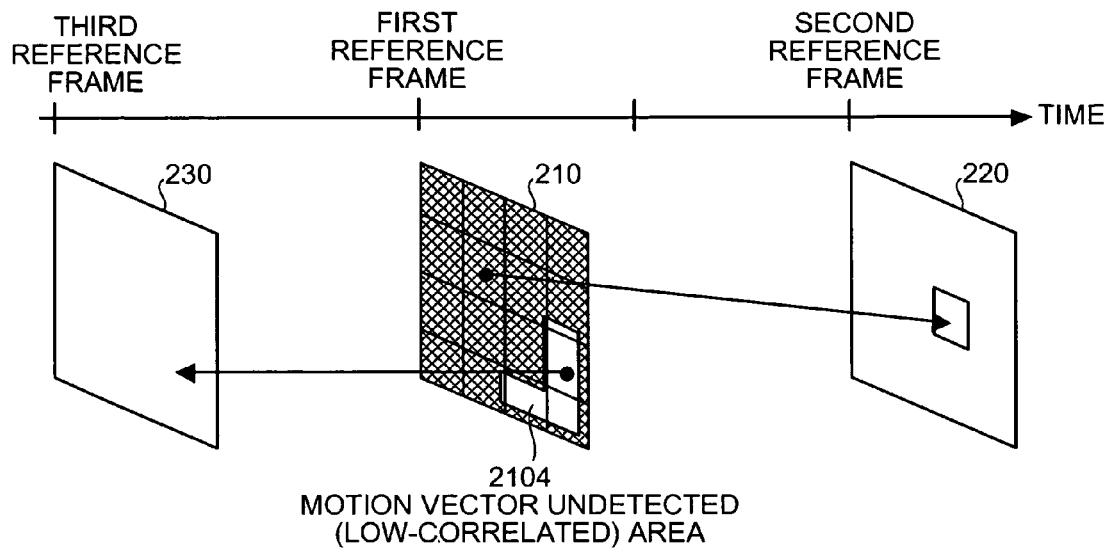
FIG. 37 is a diagram showing another third reference frame in a direction temporally opposite to the first reference frame and the second reference frame.

The occlusion area is an area where a motion vector cannot be found from two reference frames. In order to select one motion vector for the motion vector undetected area 2104 from several motion vector candidates, as shown in FIG. 37, another third reference frame in a direction temporally opposite to the first reference frame and the second reference frame is utilized.

Figure 38:
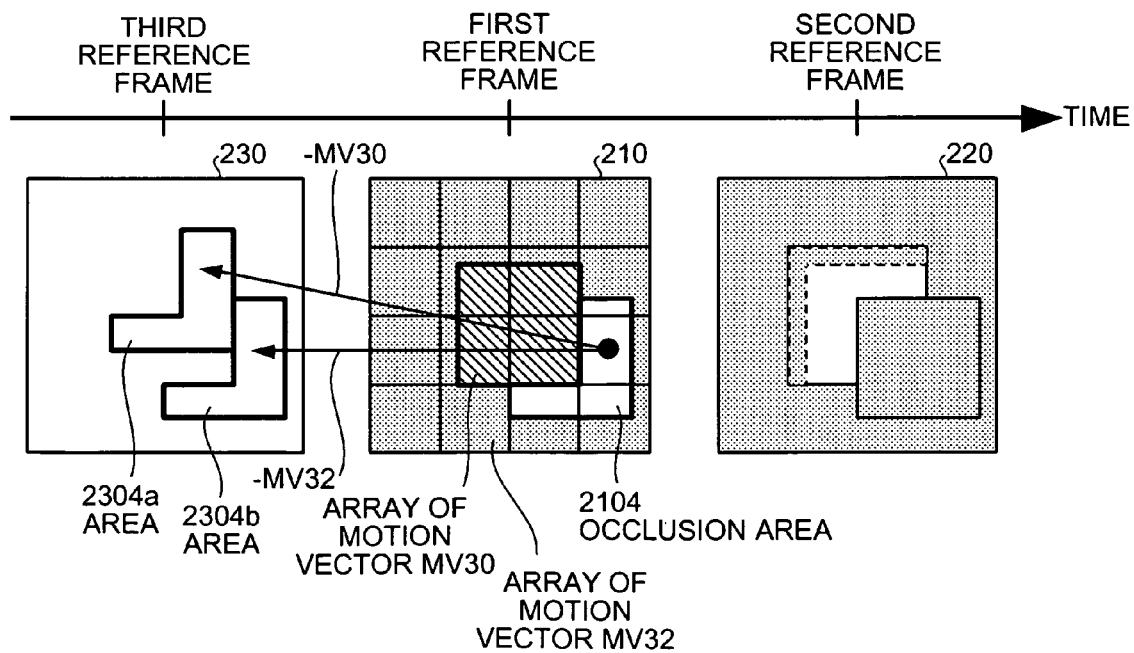
FIG. 38 is a diagram showing areas within the third reference frame extracted in an area extracting processing (step S603)

FIG. 38 is a diagram showing areas in the third reference frame 230 extracted in the area extracting processing (step S603). As shown in FIG. 38, areas 2304a and 2304b are extracted from the motion vector MV30 and the motion vector MV32, respectively.

The explanation returns to FIG. 35. Correlation calculations between the areas 2304a, 2304b extracted in the area extracting processing (step S603) and the motion vector undetected area 2104 are performed, respectively (step S604). In the present embodiment, the absolute difference value is calculated as the correlation value.

Next, select the optimum motion vector from several motion vector candidates (step S605). Specifically, a motion vector candidate for the most correlated area is selected as the motion vector for the motion vector undetected area based on the correlation calculation result in the correlation calculating processing (step S604).

In the present embodiment, a motion vector candidate corresponding to the area where the absolute difference value is the smallest is selected as the motion vector for the motion vector undetected area.

In the example of FIG. 38, the area 2304a specified by the motion vector MV30 is the area where the object 442 is present. On the other hand, the area 2304b specified by the motion vector MV32 is the area corresponding to the background 440. Therefore, the area 2304b is high-correlated with the motion vector undetected area 2104. Thus, the motion vector MV32 corresponding to the area 2304b is selected as the motion vector of the motion vector undetected area.

The correlation calculation between the motion vector undetected area and an area in the third reference frame 230 is preferably performed on pixel basis. Thus, the motion vector can be selected with accuracy on pixel basis.

Further, as another example, the correlation calculation may be performed on shape basis of the motion vector undetected area. Furthermore, as still another example, the correlation calculation may be performed on block basis.

Figure 39:
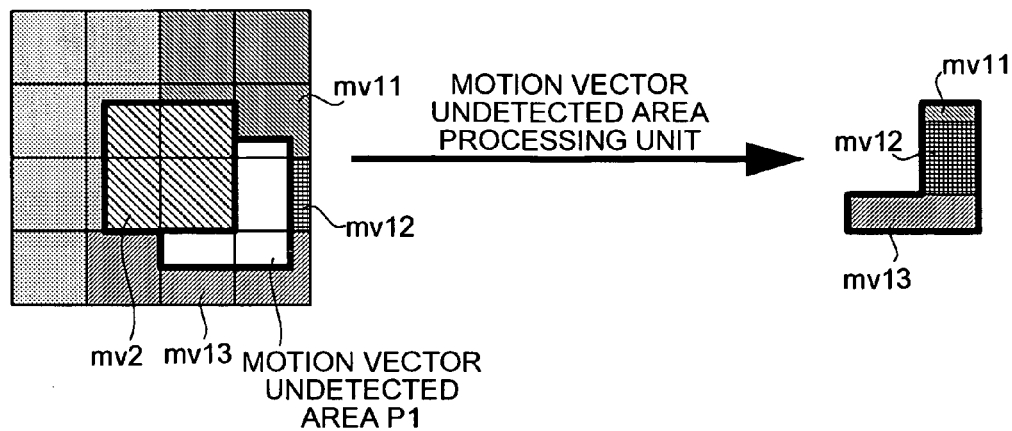
FIG. 39 is a diagram for explaining a processing when several motion vectors are present around the motion vector undetected area.

FIG. 39 is a diagram for explaining a processing when several motion vectors (mv2, mv11 to mv13) are present around the motion vector undetected area 2104. In this case, according to the motion vector undetected area processing explained with reference to FIG. 35, the motion vectors mv2, mv11 to mv13 of the surrounding areas are applied to the pixels in the motion vector undetected area 2104, respectively. Then, the correlation calculation between the area in the third reference frame 230 specified by each motion vector and the motion vector undetected area 2104 is performed. The motion vector candidate for the most-correlated area is selected as the motion vector for the motion vector undetected area 2104.

In this manner, even when more than three motion vectors are present around the motion vector undetected area 2104, the optimum motion vector therefrom can be selected as the motion vector for the motion vector undetected area.

As described above, the motion vector of the motion vector undetected area 2104 is detected. The third reference frame 230 is utilized for selecting the motion vector from the motion vector candidates and not for the motion estimation, so the calculation amount is reduced.

An object may be hidden by another object in the first reference frame. The object may have motion different from both the background and the other object. Then, the object may appear as an occlusion area in the second reference frame.

In this case, it is difficult for the present method to find the correct motion vector of the occlusion area. Thus, it is determined whether the selected motion vector is allocated to the motion vector undetected area based on the correlation calculation value between the area in the third reference frame 230 specified by the motion vector selected in the motion vector selecting processing (step S605) and the motion vector undetected area 2104.

Specifically, a threshold value of the correlation calculation value is previously set. Then, there is performed the correlation calculation between the areas in the third reference frame 230 and the second reference frame 220 specified by the motion vectors selected in the motion vector selecting processing (step S605) and the motion vector undetected area 2104. When the correlation value is smaller than the threshold value, that is, when the images in the two areas are similar (step S606, YES), the motion vector selected in the motion vector selecting processing (step S605) is determined as the motion vector to be allocated to the motion vector undetected area (step S608).

On the other hand, when the correlation value is not less than the threshold value (step S606, NO), the motion estimation by the motion vector undetected area 2104 and the third reference frame is performed without utilizing the motion vector selected in the motion vector selecting processing (step S605) to calculate the motion vector for the motion vector undetected area 2104 (step S607). In other words, the motion estimation is performed by the processing similar as in the interpolation image creating apparatus 100 according to the first embodiment.

Figure 40:
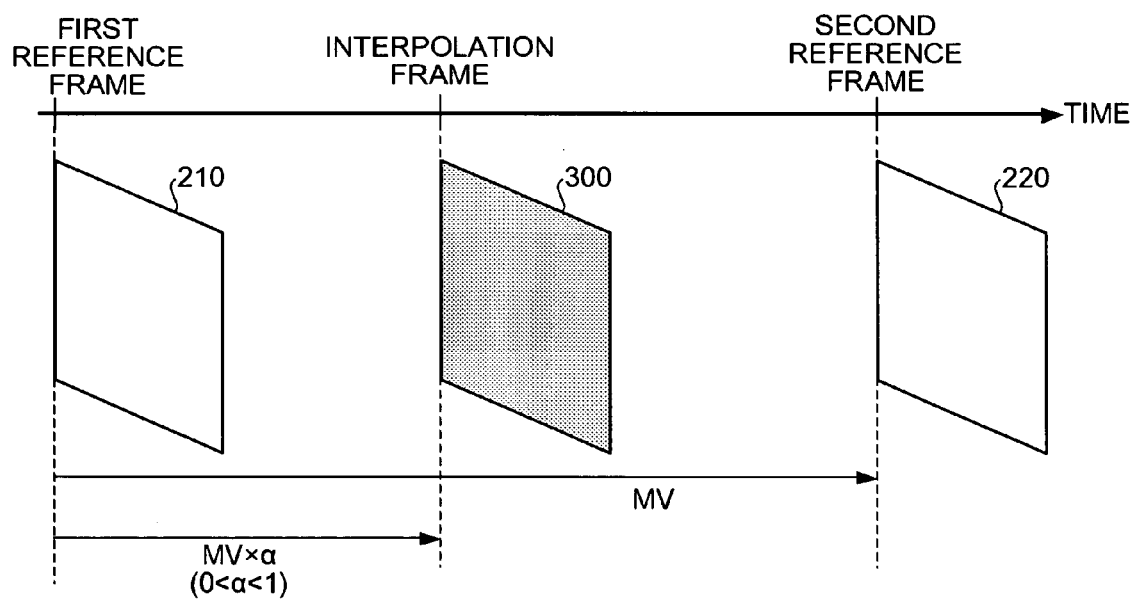
FIG. 40 is a diagram for explaining scale conversion of a motion vector.

The motion compensating unit 514 utilizes the motion vector found in the motion estimating unit 506 and the motion vector undetected area processing unit 512 to perform motion compensation. As shown in FIG. 40, the motion vector is subjected to scale conversion according to the interpolation frame generating position, thereby generating an interpolation frame at a predetermined position. The motion compensating method is not particularly limited.

When the motion compensation is performed by the above processing, applied areas may be overlapped on each other, or a gap may occur between the applied areas. When the applied areas are overlapped on each other, an average or median value of the overlapped areas or a high-correlated area between the previous and next frames is always overwritten. When a gap occurs, in-frame or inter-frame interpolation is performed.

Next, an interpolation image creating apparatus 500 according to a fourth embodiment will be described. The interpolation image creating apparatus according to the fourth embodiment divides an interpolation frame 300 into areas as shown in FIGS. 41 and 42, and performs the motion estimation of a first reference frame 210 and a second reference frame 220 with the interpolation frame 300 as a reference to create the interpolation frame 300.

Since the interpolation frame 300 is divided into areas, there is no possibility that an image is created on the interpolation frame 300 to be created in an overlapped manner or an area where an image is not created occurs, thereby creating an interpolation image with high accuracy.

Figure 41:
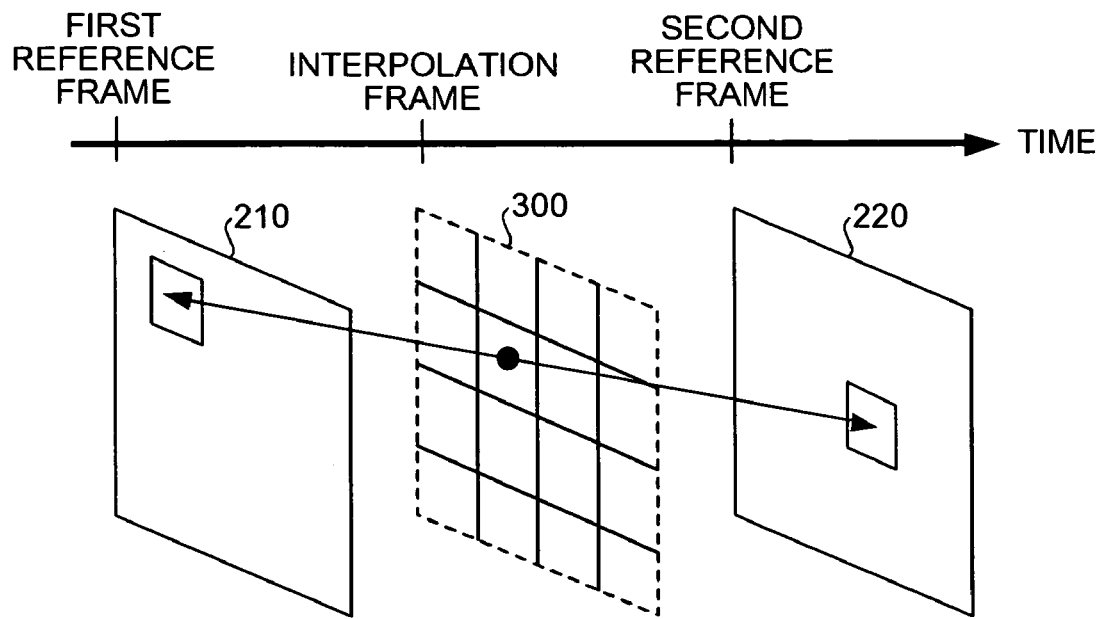
FIG. 41 is a diagram for explaining a processing of dividing an interpolation frame into areas.
Figure 42:
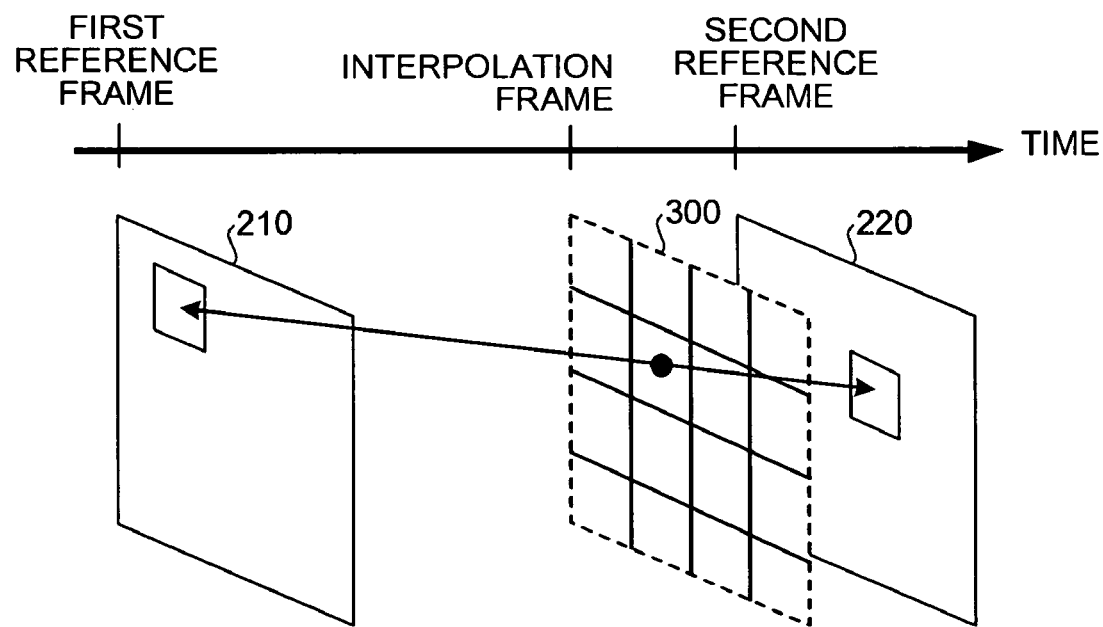
FIG. 42 is a diagram for explaining the processing of dividing the interpolation frame into areas.

In the present embodiment, as shown in FIG. 41, there will be described a case where the interpolation frame 300 is created at a position which is half the temporal length between two consecutive frames, that is, between the first reference frame 210 and the second reference frame 220, but the interpolation frame is not necessarily present at the position which is half the temporal length between the two different frames and may only be a frame to be inserted into two different frames, and the position thereof is not particularly limited.

Figure 43:
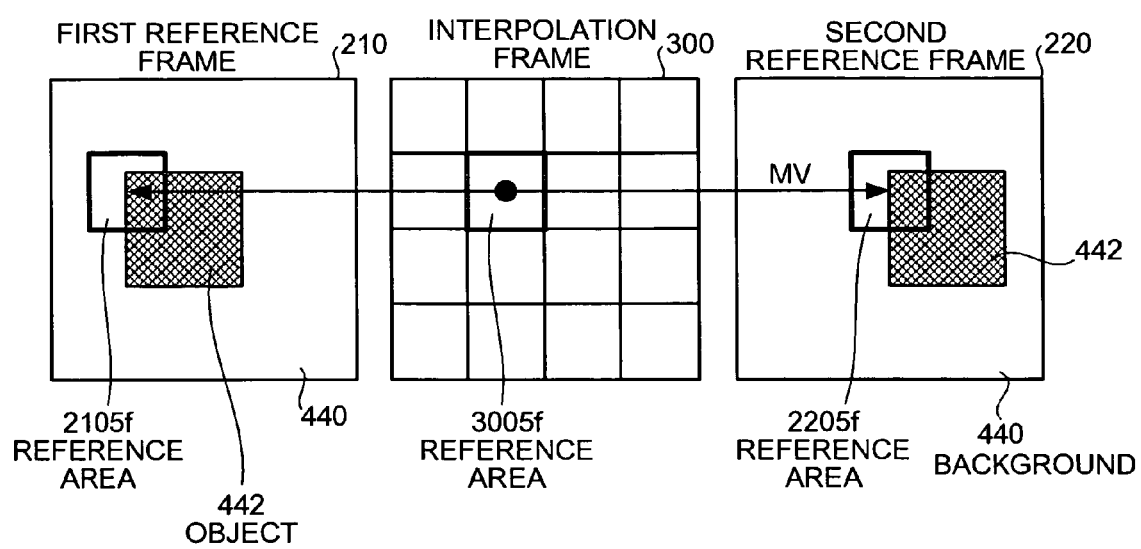
FIG. 43 is a diagram for explaining an example in which the object is horizontally moving on the still background.

Here, there will be specifically described an example in which an object 442 is horizontally moving on a still background 440 as shown in FIG. 43.

Figure 44:
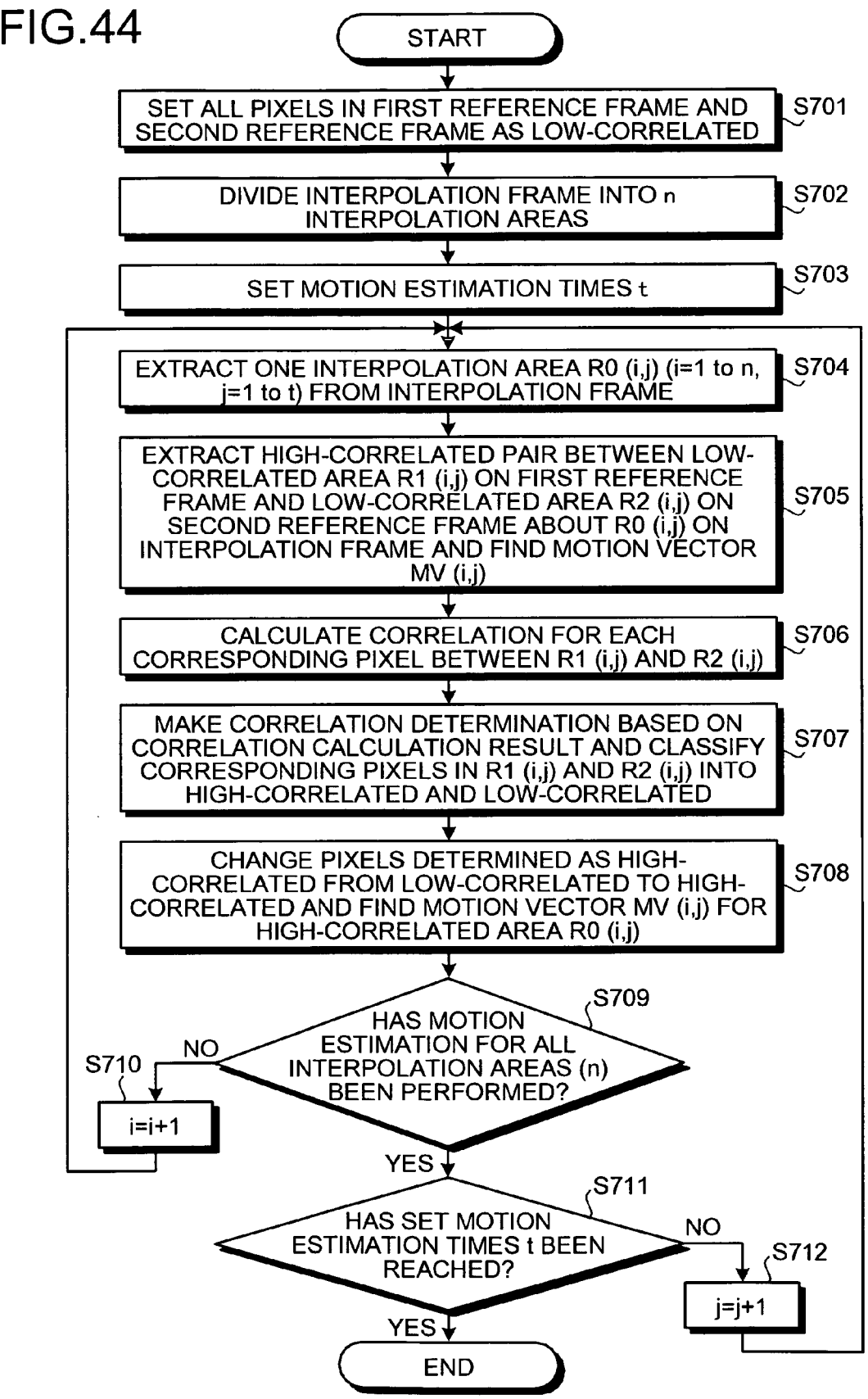
FIG. 44 is a flowchart showing a high-correlated area motion vector allocating processing by the interpolation image creating apparatus according to a fourth-embodiment.

FIG. 44 is a flowchart showing a high-correlated area motion vector allocating processing by the interpolation image creating apparatus 500 according to the fourth embodiment. As shown in FIGS. 41 and 42, in the present embodiment, a motion estimating unit 106 performs motion estimation of the first reference frame 210 and the second reference frame 220 about the interpolation frame 300.

In the present embodiment, set all the pixels in the first reference frame 210 and the second reference frame 220 as low-correlated (step S701), and then divide the interpolation frame 300 into n interpolation areas (step S702).

Set the motion estimation times t (step S703), and then extract an interpolation area from the interpolation frame (step S704). Then, with the interpolation area on the interpolation frame as a reference, extract high-correlated combinations between the low-correlated areas in the first reference frame 210 and the low-correlated areas in the second reference frame 220, and find a motion vector MV therebetween (step S705).

Next, in order to determine a correlation on pixel basis in the areas, perform correlation calculation for each corresponding pixel on a pair of first reference area and second reference area extracted in the motion estimating processing (step S705) (step S706). Next, make correlation determination on pixel basis based on the correlation calculation result in the in-area correlation calculating processing (step S706), and classify the first reference areas and the second reference area into a high-correlated area and a low-correlated area (step S707).

Change the setting of the pixels determined as high-correlated from "low-correlated" to "high-correlated", and give the motion vector MV found in the motion estimating processing (step S705) to the high-correlated area among the reference areas in the interpolation frame (step S708).

Here, the setting of the pixels determined to be high-correlated with the first reference frame and the second reference frame is changed from low-correlated to high-correlated, but this is a processing for the pixels in the first reference frame and the second reference frame. Further, the motion vector is given to the pixels on the interpolation frame.

The above processing is performed on all the reference areas (16 areas) in the interpolation frame 300, and is further repeated as often as the motion estimation times t (step S709, step S710). The high-correlated area motion vector allocating processing is completed.

Figure 45:
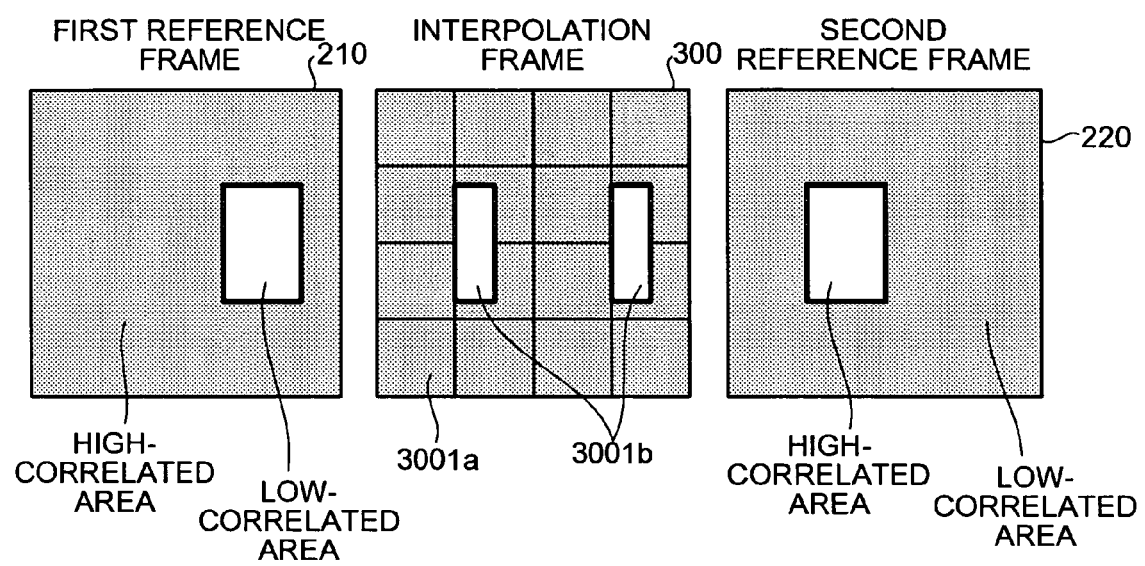
FIG. 45 is a diagram showing a correlation in each frame after the processing explained using

FIG. 45 is a diagram showing correlations in the respective frames after the processing explained in FIG. 44 is performed. In this manner, when the processing explained in FIG. 44 has been completed, the motion vector undetected areas where the motion vector has not been detected remain.

Figure 46:
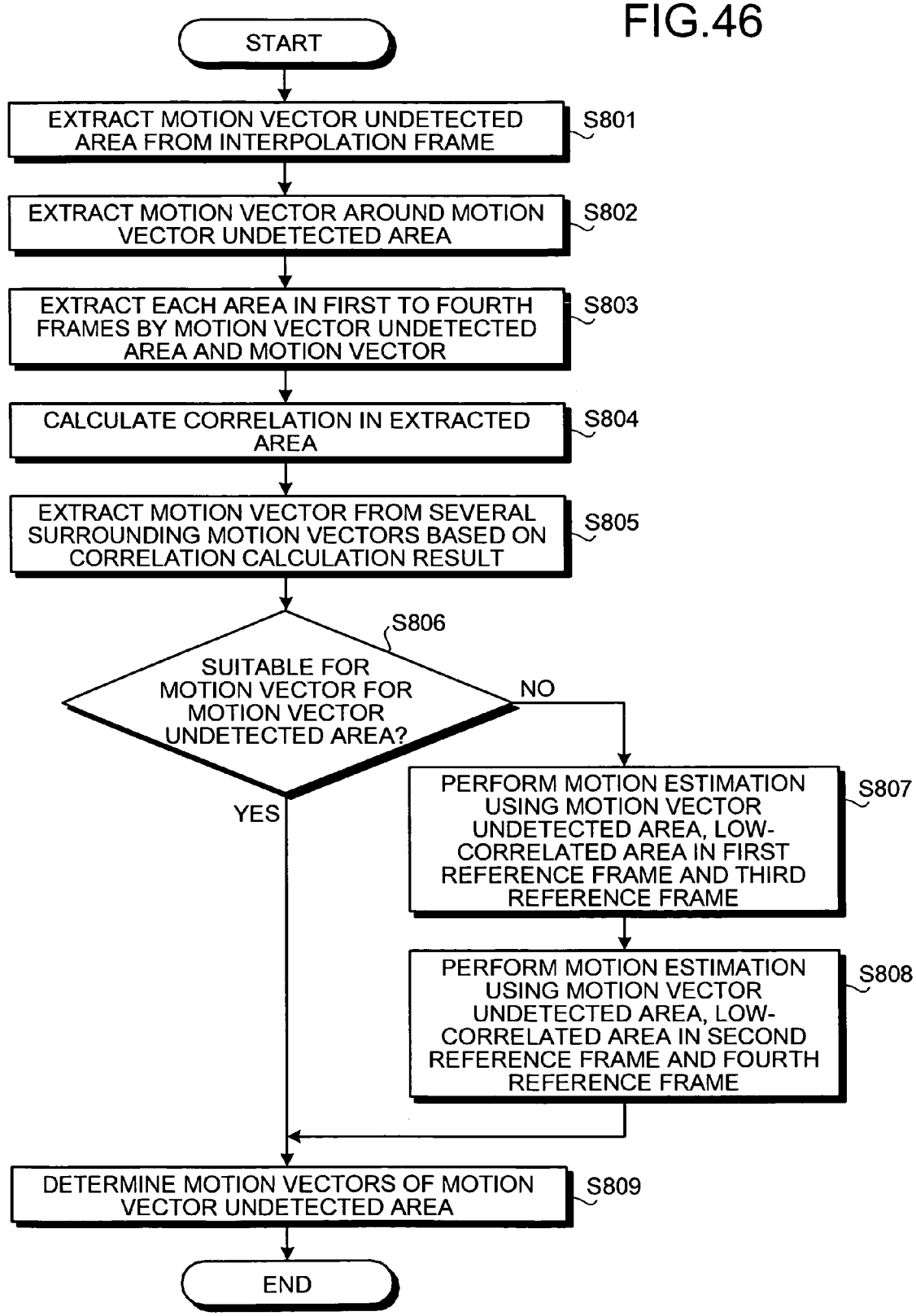
FIG. 46 is a flowchart showing a motion vector undetected area processing by the motion vector undetected area processing unit.

FIG. 46 is a flowchart showing the motion vector undetected area processing by the motion vector undetected area processing unit 512. First, the motion vector undetected area processing unit 512 extracts the motion vector undetected area from the interpolation frame 300 (step S801). Next, the unit 512 extracts the motion vector around the motion vector undetected area (step S802).

Figure 47:
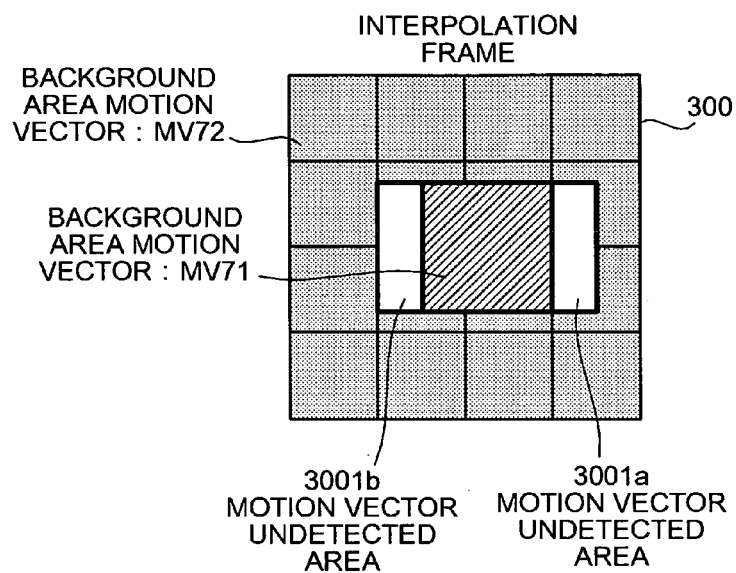
FIG. 47 is a diagram showing motion vectors around motion vector undetected areas.

FIG. 47 is a diagram showing motion vectors around motion vector undetected areas 3001a and 3001b. A motion vector MV71 for an object 420 is given to an area between the motion vector undetected area 3001a and the motion vector undetected area 3001b. A motion vector MV72 for the background 400 is given to other area. Therefore, in the example shown in FIG. 47, the motion vector MV71 and the motion vector MV72 are extracted in step S802.

Next, extract corresponding areas from the first reference frame, the second reference frame, the third reference frame and a fourth reference frame based on the object area motion vector MV71 and the background area motion vector MV72 extracted in the motion vector candidate extracting processing (step S802) about the motion vector undetected areas 3001a and 3001b (step S803).

The third reference frame is a reference frame which is present temporally before the first reference frame 210. The fourth reference frame is a frame which is present temporally after the second reference frame 220.

Figure 48:
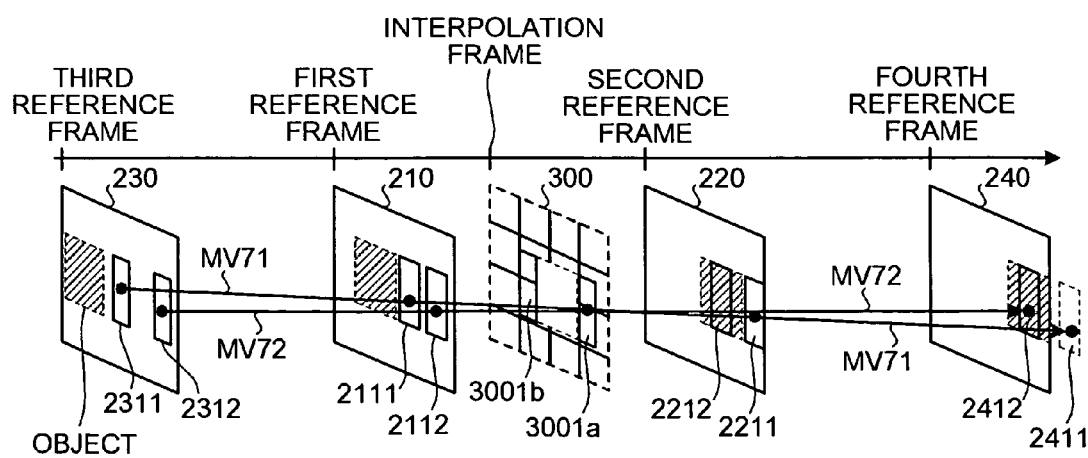
FIG. 48 is a diagram for explaining a specific processing in an area extracting processing (step S803)

FIG. 48 is a diagram for explaining a specific processing in the area extracting processing (step S803). As shown in FIG. 48, the motion vector MV71 is extended in the positive and negative directions. Then, the areas where the motion vector MV71 crosses with the first reference frame 210, the second reference frame 220, the third reference frame 230 and the fourth reference frame 240 are extracted, respectively. As shown in FIG. 48, an area 2111 is extracted from the first reference frame 210. An area 2211 is extracted from the second reference frame 220. An area 2311 is extracted from the third reference frame. An area 2411 is extracted from the fourth reference frame.

The areas where the motion vector MV72 crosses with the first reference frame 210, the second reference frame 220, the third reference frame 230 and the fourth reference frame 240 are extracted, respectively. As shown in FIG. 48, an area 2121 is extracted from the first reference frame 210. An area 2221 is extracted from the second reference area 220. An area 2321 is extracted from the third reference frame. The motion vector MV72 specifies the outside of the frame in the fourth reference frame.

The explanation returns to FIG. 46. After the area is extracted from each reference frame (step S803), the correlation calculation between the areas extracted from the first reference frame 210 and a third reference frame 230 is performed on the same motion vector. Further, the correlation calculation between the areas extracted from the second reference frame 220 and a fourth reference frame 240 is performed for the same motion vector (step S804). In the fourth embodiment, the correlation calculation uses the absolute difference value.

In the example shown in FIG. 48, the correlation calculation between the area 2111 and the area 2311 extracted from the first reference frame 210 and the third reference frame 230, respectively, is performed for the motion vector MV71. The correlation calculation between the area 2211 and the area 2411 extracted from the second reference frame 220 and the fourth reference frame 240, respectively, is performed for the motion vector MV71.

The correlation calculation between the area 2112 and the area 2312 extracted from the first reference frame 210 and the third reference frame 230, respectively, is performed for the motion vector MV72. The correlation calculation between the area 2212 and the area 2412 extracted from the second reference frame 220 and the fourth reference frame 240, respectively, is performed for the motion vector MV72.

A motion vector to be given to the motion vector undetected area is selected from several motion vectors based on the correlation calculation result (step S805). In the present embodiment, a motion vector for the area where the absolute difference value is the smallest is selected.

In the example shown in FIG. 48, one motion vector is selected from the motion vector MV71 and the motion vector MV72. In this case, the absolute difference value between the area 2121 in the first reference frame 210 and the area 2321 in the third reference frame 230 is the smallest. Therefore, the motion vector corresponding to this area, that is, the motion vector MV72 is given to the motion vector undetected area 3001a.

Figure 49:
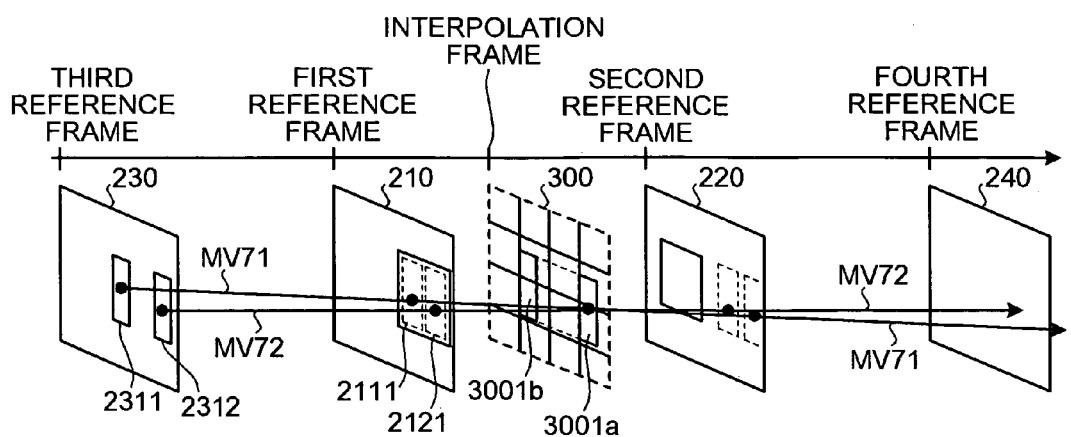
FIG. 49 is a diagram for explaining a processing of allocating a motion vector to a motion vector undetected area.

FIG. 49 is a diagram for explaining a processing of allocating a motion vector to a motion vector undetected area. As shown in FIG. 49, when specifying an area by the motion vector extracted in step S802, only the low-correlated areas in the first reference frame 210 and the second reference frame 220 are intended. Thus, the number of areas to be extracted as the areas to be subjected to correlation calculation becomes smaller.

For example, in the example shown in FIG. 48, any area in the second reference frame 220 specified by the motion vector MV71 and the motion vector MV72 is in the high-correlated area. Thus, the area is not extracted.

In this manner, the target areas are limited to the low-correlated area when extracting the areas to be specified by the motion vectors so that the number of areas to be extracted can be limited, thereby selecting the motion vectors for the motion vector undetected areas with more ease and more accuracy.

Next, it is determined whether to allocate the selected motion vector to the motion vector undetected area based on the correlation calculation value between the areas in the two frames specified by the motion vectors selected in the motion vector selecting processing (step S805).

Specifically, the threshold value of the correlation calculation value is previously set. When the correlation calculation value between the two areas specified by the motion vectors selected in the motion vector selection step (step S805) is smaller than the threshold value, that is, when the images of the two areas are similar to each other (step S806, YES), the motion vector selected in the motion vector selecting processing (step S805) is determined as the motion vector to be allocated to the motion vector undetected area (step S809).

Figure 50:
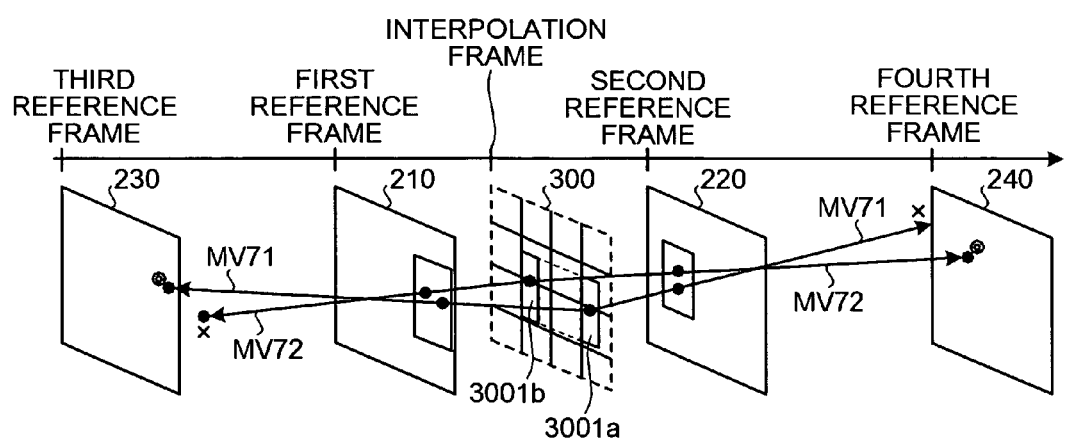
FIG. 50 is a diagram for explaining a motion estimating processing using a motion vector undetected area in an interpolation frame, a low-correlated area in the first reference frame and the third reference frame.

On the other hand, when the correlation calculation value is not less than the threshold value (step S806, NO), the motion vector selected in the motion vector selecting processing (step S805) is not utilized as shown in FIG. 50, and the motion vector undetected area in the interpolation frame, the low-correlated area in the first reference frame and the third reference frame are used to perform motion estimation (step S807). Further, the motion vector undetected area in the interpolation frame, the low-correlated area in the second reference frame and the fourth reference frame are used to perform motion estimation (step S808). Then, the motion vector of the motion vector undetected area in the interpolation frame is determined based on the result (Step S809).

Since there is restricted so that only the low-correlated area is used on the first reference frame and the third reference frame, also the estimation areas are limited, thereby performing motion estimation with less calculation and higher accuracy.

The motion compensating unit 114 utilizes the motion vectors found by the motion estimating unit 106 and the motion vector undetected area processing unit 512 to perform motion compensation. In the present embodiment, the target areas are applied on the interpolation frame according to the motion vectors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for generating an interpolation frame between a first reference frame and a second reference frame, comprising:
    dividing a frame to be interpolated as the interpolation frame between the first reference frame and the second reference frame into interpolation areas containing several pixels;
    detecting a most correlated combination from several combinations between first reference areas and second reference areas for each of the interpolation areas, the first reference areas being in the first reference frame and having the same size and shape as the interpolation areas, the second reference areas being in the second reference frame and having the same size and shape as the interpolation areas, the each of the interpolation areas, the first reference area of each of the several combinations, and the second reference area of the each of the several combinations being arranged straight time-wise;
    obtaining a motion vector from the first reference area and the second reference area included in the detected combination;
    determining whether the first reference areas and the second reference areas are in a high-correlated area or a low-correlated area;
    giving the motion vector to a motion vector detected area, the motion vector detected area corresponding to the interpolation area which is determined to be the high-correlated area in the first reference area and the second reference area;
    determining a motion vector to be given to a motion vector undetected area by motion estimation using the motion vector undetected area, a first area, a third reference frame, a second area, and a fourth reference frame, the first area being in the first reference frame and being determined as the low correlated area, the third reference frame being in a direction temporally identical to the first reference frame with the frame to be interpolated as a reference, the second area being in the second reference frame and being determined as the low-correlated area; and the fourth reference frame being in a direction temporally identical to the second reference frame with the frame to be interpolated as a reference, the motion vector undetected area corresponding to the interpolation area which is determined to be the low-correlated area in the first reference area and the second reference area; and
    generating the interpolation frame based on the motion vector given to the motion vector detected area and the motion vector determined for the motion vector undetected area.

2. The method according to claim 1, further comprising:
    detecting a most correlated combination from several combinations between the first reference areas and third reference areas, the first reference areas being in the first reference frame and in an area determined as the low-correlated area, and having the same size and shape as the motion vector undetected area, and the third reference areas being in the third reference frame and having the same size and shape as the motion vector undetected area;
    obtaining the most correlated combination between the first reference area and the third reference area;
    determining a motion vector from a detected combination between the first reference area and the third reference area;
    detecting a most correlated combination from several combinations between second reference areas and fourth reference areas, the second reference areas being in the second reference frame and in an area determined as the low correlated area and having the same size and shape as the motion vector undetected area, the fourth reference areas being in the fourth reference frame and having the same size and shaping as the motion vector undetected area;
    obtaining the most correlated combination between the second reference area and the fourth reference area; and
    determining a motion vector from a specified combination between the second area and the fourth area,
    wherein the motion vector to be given to the motion vector undetected area is determined based on the motion vector determined from a combination between the first reference area and the third reference area and the motion vector determined from a combination between the second reference area and the fourth reference area.

3. The method according to claim 2, a correlation between the first reference area and the third reference area is compared with a correlation between the second reference area and the fourth reference area, and
    a motion vector corresponding to a more correlated area is determined as the motion vector to be given to the motion vector undetected area.

4. The method according to claim 2, wherein when both the correlation between the first reference area and the third reference area and the correlation between the second reference area and the fourth reference area are smaller than a previously set threshold value, no motion vector is assumed as the motion vector for the motion vector undetected area.

5. The method according to claim 4, wherein when a motion vector has not been determined for the motion vector undetected area, an average value or median value of the motion vector given to the motion vector detected area arranged around the motion vector undetected area is determined as the motion vector of the motion vector undetected area.

6. The method according to claim 1, further comprising: further dividing the motion vector undetected area into a high-correlated area and a low-correlated area by a recursive processing,
   wherein an area divided into the high-correlated area by the recursive processing is assumed as the motion vector detected area,
   the motion vectors detected is given to the motion vector detected area, and
   an area divided into the low-correlated area is assumed as the motion vector undetected area, and
   the motion vector to be given to the motion vector undetected area is determined by motion estimation using the motion vector undetected area, a third area, a third reference frame, a fourth area, and a fourth reference frame, the third area being in the first reference frame and being determined as the low-correlated area, the third reference frame being in a direction temporally identical to the first reference frame with the frame to be interpolated as a reference, the fourth area being in the second reference frame and being determined as the low-correlated area; and the fourth reference frame being in a direction temporally identical to the second reference frame with the frame to be interpolated as a reference.

7. The method according to claim 6, wherein
   a correlation value for each corresponding area in the first reference areas is calculated by the second reference areas by the recursive processing, and
   the motion vector undetected area is divided in a high-correlated area and a low-correlated area by comparing the calculated correlation value with a preset threshold.

8. The method according to claim 6, each of the motion estimation, the correlation determination, and the motion vector detected area motion vector giving for the low-correlated area is recursively performed.

9. The method according to claim 1, a correlation value for each corresponding area in the first reference areas and the second reference areas is calculated, and
   whether the area is a high-correlated area or low-correlated area is determined by comparing the calculated correlation value with a preset threshold.

10. The method according to claim 1, one of a correlation value determined by an absolute difference value of luminance information, an absolute difference value of color difference information, a sum of absolute difference values, and the number of high-correlated pixels is calculated.

11. The method according to claim 1, wherein when several motion vectors are given to one area, an average value of images in other reference frames, which are specified by the several motion vectors, respectively, with the first reference frame as a reference is allocated to the frame to be interpolated.

12. The method according to claim 1, wherein when several motion vectors are given to one area, a motion vector where a correlation value between areas in several other reference frames detected by the several motion vectors with the first reference frame as a reference is the smallest is determined as the motion vector to be given to the motion vector undetected area.

13. A method for generating an interpolation frame between a first reference frame and a second reference frame, comprising:
   dividing the first reference frame into several first reference areas each constituted of several pixels;
   detecting second reference areas which have the same size and shape as the first reference areas and most correlated therewith in the second reference frame,
   obtaining motion vectors of the detected second reference areas and the first reference areas;
   determining whether the first reference areas and the second reference areas are in a high-correlated area or a low-correlated area;
   giving the motion vector to a motion vector detected area, the motion vector detected area being determined to be the high-correlated area;
   determining a motion vector of a motion vector undetected area by motion estimation using the motion vector undetected area and a third reference frame, the third reference frame being in a direction temporally opposite to the second reference frame with the first reference frame as a reference, and the motion vector undetected area being determined to be the low-correlated area and being in the first reference area; and
   generating the interpolation frame based on the motion vector given to the motion vector detected area and the motion vector determined for the motion vector undetected area.

14. The method according to claim 13, the interpolation frame is generated based on a temporal position of an interpolation between the first reference frame and the second reference frame.

15. The method according to claim 13, further comprising further dividing the motion vector undetected area into a high-correlated area and a low-correlated area by a recursive processing,
   wherein an area divided into the high-correlated area is assumed as the motion vector detected area,
   the motion vector is given to the motion vector detected area,
   an area divided into the low-correlated area is assumed as the motion vector undetected area, and
   the motion vector of the motion vector undetected area is determined by motion estimation using the motion vector undetected area and the third reference frame.

16. The method according to claim 15, wherein
   a correlation value for each corresponding area in the first reference areas and the second reference areas is calculated, and
   the motion vector undetected area is divided in a high-correlated area and a low-correlated area by comparing the calculated correlation value with a preset threshold.

17. The method according to claim 15, wherein each of the motion estimation, the correlation determination, and the motion vector detected area motion vector giving for the low-correlated area is recursively performed.

18. A method for generating an interpolation frame between a first reference frame and a second reference frame, comprising:
   dividing a frame to be interpolated as the interpolation frame between the first reference frame and the second reference frame into interpolation areas containing several pixels;
   detecting a most correlated combination from combinations between first reference areas and second reference areas for each of the interpolation areas, the first reference areas being in the first reference frame and having the same size and shape as the interpolation areas, the second reference areas being in the second reference frame and having the same size and shape as the interpolation areas, the each of the interpolation frames, the first reference area of each of the several combinations and the second reference area of the each of the several combinations being arranged straight time-wise;

obtaining a motion vector from the first reference area and the second reference area included in the detected combination;

determining whether the first reference area and the second reference area are in a high-correlated area or a low-correlated area;

giving a motion vector detected area corresponding to the interpolation area which is determined to be the high-correlated area in the first reference area and the second reference area;

giving a motion vector undetected area corresponding to the interpolation area which is determined to be the low-correlated area in the first reference area and the second reference area; and generating the interpolation frame based on the motion vector given to the motion vector detected area and the motion vector given to the motion vector undetected area.

19. The method according to claim 18, wherein the motion vector given to the motion vector detected area adjacent to the motion vector undetected area is given to the motion vector undetected area.

20. The method according to claim 18, further comprising:
finding a correlation value between the first reference area which is in the first reference frame determined by the motion vector given to the motion vector detected area arranged around the motion vector undetected area with the motion vector undetected area as a reference and a third reference area which is in a third reference frame in a direction temporally identical to the first reference frame and is determined by the motion vector with the interpolation frame as a reference; and finding a correlation value between the second reference area which is in the second reference frame determined by the motion vector given to the motion vector detected area arranged around the motion vector undetected area with the motion vector undetected area as a reference and a fourth reference areas which is in a fourth reference frame in a direction temporally identical to the second reference frame and is determined by the motion vector with the interpolation frame as a reference, wherein the motion vector to be given to the motion vector undetected area is determined based on the correlation value between the first reference area and the third reference area and the correlation value between the second reference area and the fourth reference area.

21. The method according to claim 20, wherein when there are several motion vectors of the motion vector detected area arranged around the motion vector undetected area, the motion vector to be given to the motion vector undetected area from the several motion vectors is determined based on the correlation value between the first reference area and the third reference area and the correlation value between the second reference area and the fourth reference area.

22. The method according to claim 21, wherein a motion vector corresponding to a most correlated area is determined as the motion vector to be given to the motion vector undetected area based on the correlation value between the first reference area and the third reference area and the correlation value between the second reference area and the fourth reference area.

23. The method according to claim 20, wherein when both the correlation value between the first reference area and the third reference area and the correlation value between the second reference area and the fourth reference area are smaller than a preset threshold value, any motion vector is not assumed as a motion vector for the motion vector undetected area.

24. The method according to claim 23, wherein when the motion vector given to the motion vector detected area arranged around the motion vector undetected area is not assumed as a motion vector for the motion vector undetected area, and
a motion vector is given to the motion vector undetected area, the motion vector being determined by motion estimation using the motion vector undetected area, a first area, a third reference frame, a second area, and a fourth reference frame, the first area being in the first reference frame and being determined as the low-correlated area, the third reference frame being in a direction temporally identical to the first reference frame with the interpolation frame as a reference, the second area being in the second reference frame and being determined as the low-correlated area, and the fourth reference frame being in a direction temporally identical to the second reference frame with the interpolation frame as a reference.

25. The method according to claim 18, wherein
when the first reference area in the first reference frame determined by the motion vector given to the motion vector detected area arranged around the motion vector undetected area is an area determined as the low-correlated area, a correlation value between the first reference area and the third reference area is found, and
when the second reference area in the second reference frame determined by the motion vector given to the motion vector detected area arranged around the motion vector undetected areas is an area determined as the low-correlated area in the correlation determining step, a correlation value between the second reference area and the fourth reference area is found.

26. The method according to claim 18, further comprising further dividing the motion vector undetected area into a high-correlated area and a low-correlated area by a recursive processing,
wherein an area determined as the high-correlated area is assumed as the motion vector detected area,
the motion vector is given to the motion vector detected area, and
a motion vector determined by motion estimation using the motion vector undetected area which is determined to be the low-correlated area and the third reference frame is given to the motion vector undetected area.

27. The method according to claim 26, a correlation calculation for each corresponding area in the first reference areas and the second reference areas is performed, and
whether to be a high-correlated area or low-correlated area is determined by comparing a calculation result with a preset threshold.

28. The method according to claim 26, each of the motion estimation, the correlation determination, and the motion vector detected area motion vector allocation in the low-correlated area is recursively performed.

29. A method for generating an interpolation frame between a first reference frame and a second reference frame, comprising:
dividing the first reference frame into several first reference areas each constituted of several pixels;
detecting second reference areas, in the second reference frame, having the same size and shape as the first reference areas and being most correlated to the first reference areas;

obtaining motion vectors of the detected second reference areas and the first reference areas;

determining whether the first reference area and the second reference area are in a high-correlated area or a low-correlated area;

giving the motion vector to a motion vector detected area, the motion vector detected area being determined to be the high-correlated area in the first reference area;

giving the motion vector given to the motion vector detected area arranged around a motion vector undetected area to the motion vector undetected area, the motion vector undetected area being determined to be the low-correlated area in the first reference area; and generating the interpolation frame based on the motion vector given to the motion vector detected area and the motion vector given to the motion vector undetected area.

30. The method according to claim 29, wherein the motion vector given to the motion vector detected area adjacent to the motion vector undetected area is given to the motion vector undetected area.

31. The method according to claim 29, further comprising:
finding a correlation value between the second reference area in the second reference frame determined by the motion vector given to the motion vector detected area arranged around the motion vector undetected area and the motion vector undetected area with the motion vector undetected area as a reference; and finding a correlation value between a third reference area in the third reference frame determined by the motion vector given to the motion vector detected area arranged around the motion vector undetected area and the motion vector undetected area with the motion vector undetected area as a reference, wherein the motion vector to be given to the motion vector undetected area is determined based on the correlation value between the second reference frame and the motion vector undetected area and the correlation value between the third reference area and the motion vector undetected area.

32. The method according to claim 31, wherein when there are several motion vectors of the motion vector detected area arranged around the motion vector undetected area, the motion vector to be given to the motion vector undetected area from the several motion vectors is determined based on the correlation value between the second reference frame and the motion vector undetected area and the correlation value between the third reference area and the motion vector undetected area.

33. The method according to claim 31, wherein a motion vector corresponding to the most correlated area is determined as the motion vector to be given to the motion vector undetected area based on the correlation value between the second reference frame and the motion vector undetected area and the correlation value between the third reference area and the motion vector undetected area.

34. The method according to claim 31, wherein when both the correlation value between the second reference frame and the motion vector undetected area and the correlation value between the third reference area and the motion vector undetected area are smaller than a preset threshold, a motion vector corresponding to an area is not assumed as a motion vector for the motion vector undetected area.

35. The method according to claim 34, wherein when the motion vector given to the motion vector detected area arranged around the motion vector undetected area is not assumed as a motion vector for the motion vector undetected area, the motion vector is given to the motion vector undetected area, the motion vector being determined by motion estimation using the motion vector undetected area, a first area, a third reference frame, a second area, and a fourth reference frame, the first area being in the first reference frame and being determined as the low-correlated area, the third reference frame being in a direction temporally identical to the first reference frame with the interpolation frame as a reference, the second area being in the second reference frame and being determined as the low-correlated area; and the fourth reference frame being in a direction temporally identical to the second reference frame with the interpolation frame as a reference is given to the motion vector undetected area.

36. The method according to claim 29, the interpolation frame is generated based on a temporal position of an interpolation frame between the first reference frame and the second reference frame.

37. A computer program product having a non-transitory computer readable medium including programmed instructions for generating an interpolation frame between a first reference frame and a second reference frame, wherein the instructions, when executed by a computer, cause the computer to perform:

dividing a frame to be interpolated as the interpolation frame between the first reference frame and the second reference frame into interpolation areas containing several pixels;

detecting a most correlated combination from several combinations between first reference areas and second reference areas for each of the interpolation areas, the first reference areas being in the first reference frame and having the same size and shape as the interpolation areas, the second reference areas being in the second reference frame and having the same size and shape as the interpolation areas, the each of the interpolation areas, the first reference area of each of the several combinations and the second reference area of the each of the several combinations being arranged straight time-wise;

obtaining a motion vector from the first reference area and the second reference area included in the detected combination;

determining whether the first reference areas and the second reference areas are in a high-correlated area or a low-correlated area;

giving the motion vector to a motion vector detected area, the motion vector detected area corresponding to the interpolation area which is determined to be the high-correlated area in the first reference area and the second reference area;

determining a motion vector to be given to a motion vector undetected area by motion estimation using the motion vector undetected area, a first area, a third reference frame, a second area, and a fourth reference frame, the first area being in the first reference frame and being determined as the low correlated area, the third reference frame being in a direction temporally identical to the first reference frame with the frame to be interpolated as a reference, the second area being in the second reference frame and is determined as the low-correlated area; and the fourth reference frame being in a direction temporally identical to the second reference frame with the frame to be interpolated as a reference, the motion vector undetected area corresponding to the interpolation area which is determined to be the low-correlated area in the first reference area and the second reference area; and generating the interpolation frame based on the motion vector given to the motion vector detected area and the motion vector determined for the motion vector undetected area.

38. A computer program product having a non-transitory computer readable medium including programmed instructions for generating an interpolation frame between a first reference frame and a second reference frame, wherein the instructions, when executed by a computer, cause the computer to perform:
dividing the first reference frame into several first reference areas each constituted of several pixels;
detecting second reference areas which have the same size and shape as the first reference areas and most correlated therewith in the second reference frame,
obtaining motion vectors of the detected second reference areas and the first reference areas;
determining whether the first reference areas and the second reference areas are in a high-correlated area or a low-correlated area;
giving the motion vector to a motion vector detected area, the motion vector detected area being determined to be the high-correlated area;
determining a motion vector of a motion vector undetected area by motion estimation using the motion vector undetected area and a third reference frame, the third reference frame being in a direction temporally opposite to the second reference frame with the first reference frame as a reference, and the motion vector undetected area being determined to be the low-correlated area and being in the first reference area; and
generating the interpolation frame based on the motion vector given to the motion vector detected area and the motion vector determined for the motion vector undetected area.

39. A computer program product having a non-transitory computer readable medium including programmed instructions for generating an interpolation frame between a first reference frame and a second reference frame, wherein the instructions, when executed by a computer, cause the computer to perform:
dividing a frame to be interpolated as the interpolation frame between the first reference frame and the second reference frame into interpolation areas each constituted of several pixels;
detecting a most correlated combination from combinations between first reference areas and second reference areas for each of the interpolation areas, the first reference areas being in the first reference frame and having the same size and shape as the interpolation areas, the second reference areas being in the second reference frame and having the same size and shape as the interpolation areas, the each of the interpolation frames, the first reference area of each of the several combinations and the second reference area of the each of the several combinations being arranged straight time-wise;
obtaining a motion vector from the first reference area and the second reference area included in the detected combination;
determining whether the first reference area and the second reference area are in a high-correlated area or a low-correlated area;
giving a motion vector detected area corresponding to the interpolation area which is determined to be the high-correlated area in the first reference area and the second reference area;
giving a motion vector undetected area corresponding to the interpolation area which is determined to be the low-correlated area in the first reference area and the second reference area; and
generating the interpolation frame based on the motion vector given to the motion vector detected area and the motion vector given to the motion vector undetected area.

40. A computer program product having a non-transitory computer readable medium including programmed instructions for generating an interpolation frame between a first reference frame and a second reference frame, wherein the instructions, when executed by a computer, cause the computer to perform:
dividing the first reference frame into several first reference areas each constituted of several pixels;
detecting second reference areas, in the second reference frame, having the same size and shape as the first reference areas and being most correlated to the first reference areas;
obtaining motion vectors of the detected second reference areas and the first reference areas;
determining whether the first reference area and the second reference area are in a high-correlated area or a low-correlated area;
giving the motion vector to a motion vector detected area, the motion vector detected area being determined to be the high-correlated area in the first reference area;
giving the motion vector given to the motion vector detected area arranged around a motion vector undetected area to the motion vector undetected area, the motion vector undetected area being determined to be the low-correlated area in the first reference area; and
generating the interpolation frame based on the motion vector given to the motion vector detected area and the motion vector given to the motion vector undetected area.

41. An apparatus for generating an interpolation frame between a first reference frame and a second reference frame, comprising:
a process;
an interpolation dividing unit that divides a frame to be interpolated as the interpolation frame between the first reference frame and the second reference frame into interpolation areas containing several pixels;
a combination detecting unit that detects a most correlated combination from several combinations between first reference areas and second reference areas for each of the interpolation areas, the first reference areas being in the first reference frame and having the same size and shape as the interpolation areas, the second reference areas being in the second reference frame and having the same size and shape as the interpolation areas, the each of the interpolation areas, the first reference area of each of the several combinations and the second reference area of the each of the several combinations being arranged straight time-wise;
a motion estimating unit that obtains a motion vector from the first reference area and the second reference area included in the detected combination;
a correlation determining unit that determines whether the first reference areas and the second reference areas are in a high-correlated area or a low-correlated area;
a giving unit that gives the motion vector to a motion vector detected area, the motion vector detected area corresponding to the interpolation area which is determined to be the high-correlated area in the first reference area and the second reference area;

a motion vector determining unit that determines a motion vector to be given to a motion vector undetected area by motion estimation using the motion vector undetected area, a first area, a third reference frame, a second area, and a fourth reference frame, the first area being in the first reference frame and being determined as the low correlated area, the third reference frame being in a direction temporally identical to the first reference frame with the frame to be interpolated as a reference, the second area being in the second reference frame and is determined as the low-correlated area; and the fourth reference frame being in a direction temporally identical to the second reference frame with the frame to be interpolated as a reference, the motion vector undetected area corresponding to the interpolation area which is determined to be the low-correlated area in the first reference area and the second reference area; and a motion compensation unit that generates the interpolation frame based on the motion vector given to the motion vector detected area and the motion vector determined for the motion vector undetected area.

42. An apparatus for generating an interpolation frame between a first reference frame and a second reference frame, comprising:

a processor;

an area generating unit that divides the first reference frame into several first reference areas each constituted of several pixels;

a second reference detecting unit that detects second reference areas which have the same size and shape as the first reference areas and most correlated therewith in the second reference frame, a motion estimating unit that obtains motion vectors of the detected second reference areas and the first reference areas;

a correlation determining unit that determines whether the first reference areas and the second reference areas are in a high-correlated area or a low-correlated area;

a motion vector giving unit that gives the motion vector to a motion vector detected area, the motion vector detected area being determined to be the high-correlated area;

a motion vector determining unit that determines a motion vector of a motion vector undetected area by motion estimation using the motion vector undetected area and a third reference frame, the third reference frame being in a direction temporally opposite to the second reference frame with the first reference frame as a reference, and the motion vector undetected area being determined to be the low-correlated area and being in the first reference area; and a motion vector compensating unit that generates the interpolation frame based on the motion vector given to the motion vector detected area and the motion vector determined for the motion vector undetected area.

43. An apparatus for generating an interpolation frame between a first reference frame and a second reference frame, comprising:

a processor;

an area generating unit that divides a frame to be interpolated as the interpolation frame between the first reference frame and a second reference frame into interpolation areas each constituted of several pixels;

a combination detecting unit that detects a most correlated combination from combinations between first reference areas and second reference areas for each of the interpolation areas, the first reference areas being in the first reference frame and having the same size and shape as the interpolation areas, the second reference areas being in the second reference frame and having the same size and shape as the interpolation areas, the each of the interpolation frames, the first reference area of each of the several combinations and the second reference area of the each of the several combinations being arranged straight time-wise;

a motion estimating unit that obtains a motion vector from the first reference area and the second reference area included in the detected combination;

a correlation determining unit that determines whether the first reference area and the second reference area are in a high-correlated area or a low-correlated area;

a first motion vector giving unit that gives a motion vector detected area corresponding to the interpolation area which is determined to be the high-correlated area in the first reference area and the second reference area;

a second motion vector giving unit that gives a motion vector undetected area corresponding to the interpolation area which is determined to be the low-correlated area in the first reference area and the second reference area; and a motion compensation unit that generates the interpolation frame based on the motion vector given to the motion vector detected area and the motion vector given to the motion vector undetected area.

44. An apparatus for generating an interpolation frame between a first reference frame and a second reference frame, comprising:

a processor;

an area generating unit that divides the first reference frame into several first reference areas each constituted of several pixels;

a second reference area detecting unit that detects second reference areas, in the second reference frame, having the same size and shape as the first reference areas and being most correlated to the first reference areas;

a motion estimating unit that obtains motion vectors of the detected second reference areas and the first reference areas;

a correlation determining unit that determines whether the first reference area and the second reference area are in a high-correlated area or a low-correlated area;

a first motion vector giving unit that gives the motion vector to a motion vector detected area, the motion vector detected area being determined to be the high-correlated area in the first reference area;

a second motion vector giving unit that gives the motion vector given to the motion vector detected area arranged around a motion vector undetected area to the motion vector undetected area, the motion vector undetected area being determined to be the low-correlated area in the first reference area; and a motion compensating unit that generates the interpolation frame based on the motion vector given to the motion vector detected area and the motion vector given to the motion vector undetected area.

* * * * *